(12) United States Patent
Vasquez et al.

(10) Patent No.: US 9,836,232 B1
(45) Date of Patent: Dec. 5, 2017

(54) DATA STORAGE DEVICE AND METHOD FOR USING SECONDARY NON-VOLATILE MEMORY FOR TEMPORARY METADATA STORAGE

(71) Applicant: Western Digital Technologies, Inc., Irvine, CA (US)

(72) Inventors: Steven R. Vasquez, Rancho Santa Margarita, CA (US); James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 198 days.

(21) Appl. No.: 14/870,571

(22) Filed: Sep. 30, 2015

(51) Int. Cl.
G06F 3/06 (2006.01)
G06F 12/08 (2016.01)
G06F 12/0868 (2016.01)

(52) U.S. Cl.
CPC ............ G06F 3/0619 (2013.01); G06F 3/068 (2013.01); G06F 3/0647 (2013.01); G06F 3/0656 (2013.01); G06F 3/0688 (2013.01); G06F 12/0868 (2013.01)

(58) Field of Classification Search
CPC .... G06F 3/0619; G06F 3/0647; G06F 3/0688; G06F 3/0656; G06F 3/068; G06F 3/0685; G06F 12/0866; G06F 12/0868; G06F 12/0871; G06F 12/0873; G06F 2212/214; G06F 2212/217; G06F 2212/22; G06F 2212/222; G06F 2212/2228; G06F 2212/224; G06F 2212/225; G06F 2212/312; G06F 2212/313
See application file for complete search history.

(56) References Cited

U.S. PATENT DOCUMENTS

| | | |
|---|---|---|
| 6,856,556 B1 | 2/2005 | Hajeck |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |

(Continued)

OTHER PUBLICATIONS

James N. Malina, et al., U.S. Appl. No. 14/642,597, filed Mar. 9, 2015, 50 pages.

*Primary Examiner* — Michael Krofcheck
(74) *Attorney, Agent, or Firm* — Foley & Lardner LLP

(57) ABSTRACT

A data storage device is disclosed comprising a volatile memory, a primary and a first secondary non-volatile memory (NVM), and control circuitry coupled to the volatile memory and the primary and first secondary NVM and configured to (a) write metadata and user data associated with a host write command to the volatile memory; (b) write the user data to the primary NVM; (c) continue to write metadata associated with each of one or more host write commands to the volatile memory, and when a first condition is met, write metadata that has accumulated in the volatile memory to the first secondary NVM; and (d) repeat (c), and when a second condition is met, then write at least a portion of the metadata that has accumulated in the first secondary NVM or the volatile memory to the primary NVM.

26 Claims, 14 Drawing Sheets

(56) References Cited

U.S. PATENT DOCUMENTS

| | | |
|---|---|---|
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2007/0300037 A1* | 12/2007 | Rogers ............... G06F 12/0292 711/202 |
| 2008/0052449 A1* | 2/2008 | Kim .................. G06F 13/1678 711/103 |
| 2008/0270730 A1 | 10/2008 | Lasser et al. |
| 2009/0196102 A1* | 8/2009 | Kim .................... G11C 7/1045 365/185.11 |
| 2010/0070729 A1 | 3/2010 | Ng et al. |
| 2010/0174849 A1 | 7/2010 | Walston et al. |
| 2010/0250793 A1 | 9/2010 | Syu |
| 2010/0287332 A1* | 11/2010 | Koshiyama ......... G06F 12/0246 711/103 |
| 2010/0318821 A1* | 12/2010 | Kwan .................. G06F 1/3225 713/320 |
| 2011/0099323 A1 | 4/2011 | Syu |
| 2011/0208914 A1* | 8/2011 | Winokur ............. G06F 11/1441 711/119 |
| 2011/0276744 A1* | 11/2011 | Sengupta ........... G06F 12/0866 711/103 |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0046918 A1 | 2/2013 | Im |
| 2013/0073816 A1 | 3/2013 | Seo et al. |
| 2013/0132638 A1 | 5/2013 | Horn et al. |
| 2013/0145106 A1 | 6/2013 | Kan |
| 2013/0227206 A1 | 8/2013 | Carannante et al. |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0164675 A1* | 6/2014 | Ehrlich ............... G06F 12/0246 711/103 |
| 2014/0181432 A1 | 6/2014 | Horn |
| 2014/0223121 A1* | 8/2014 | Brown .................... G06F 12/16 711/162 |
| 2014/0223255 A1 | 8/2014 | Lu et al. |
| 2015/0095572 A1* | 4/2015 | Koike .................. G06F 3/0634 711/114 |

* cited by examiner

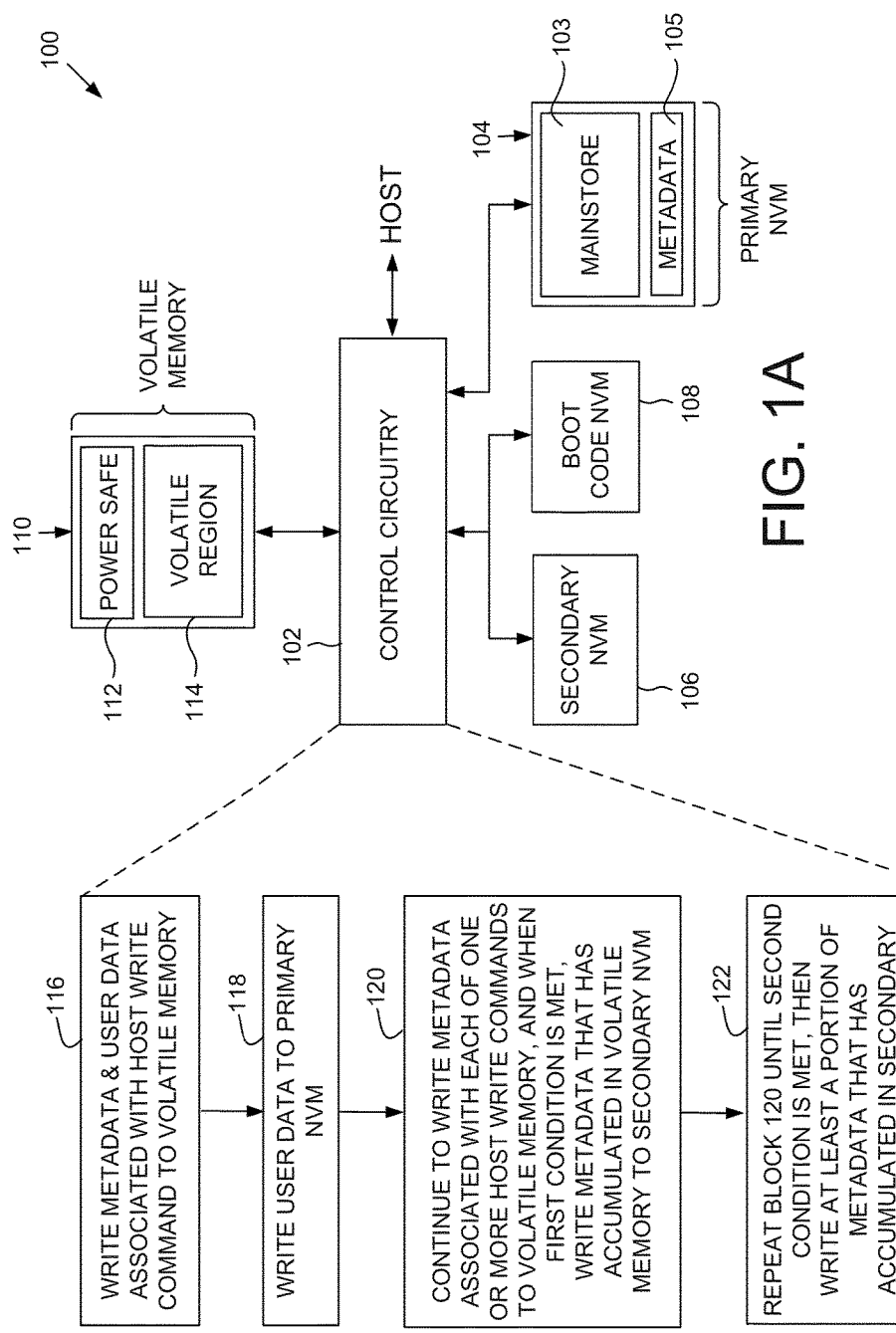

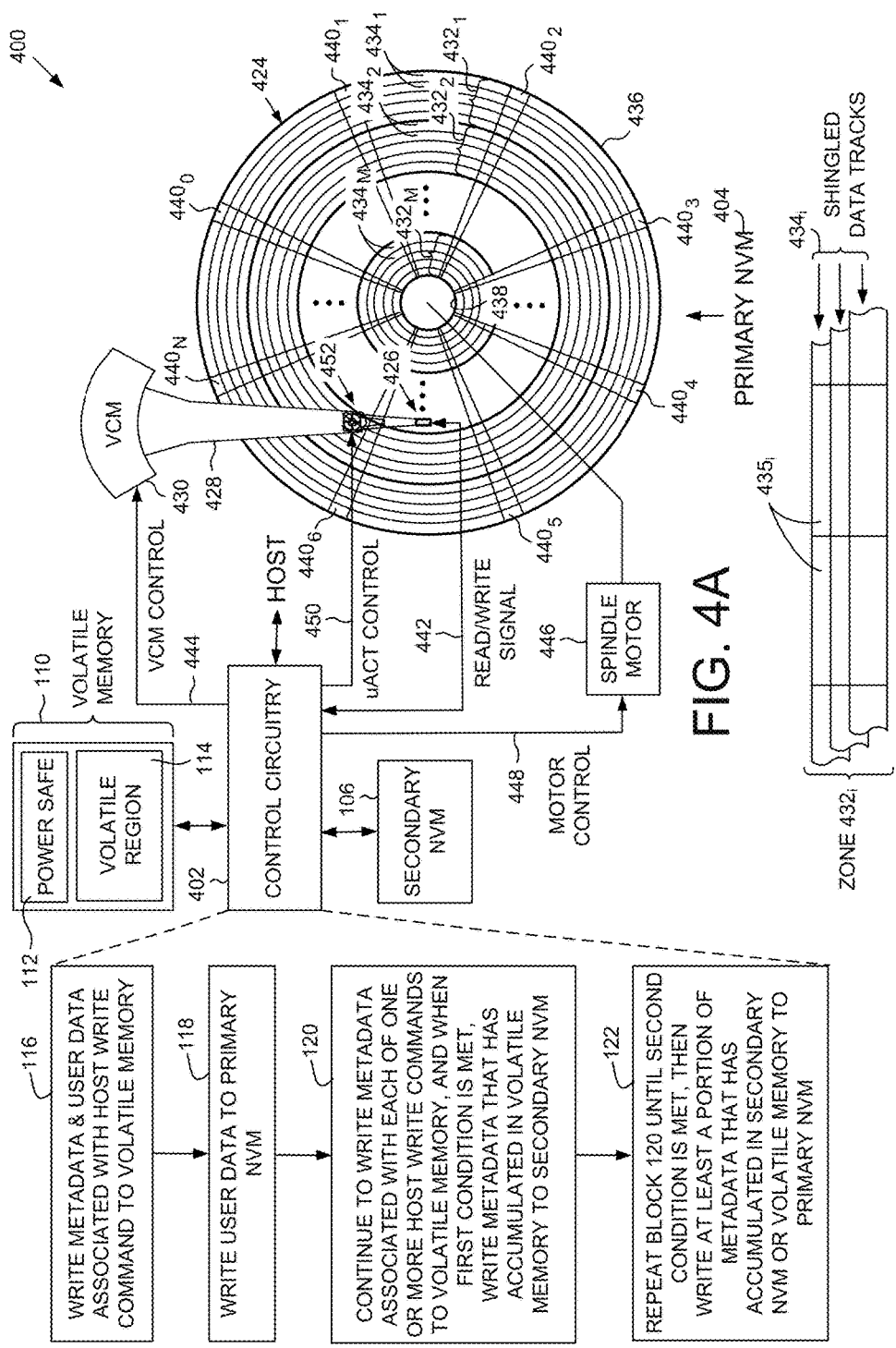

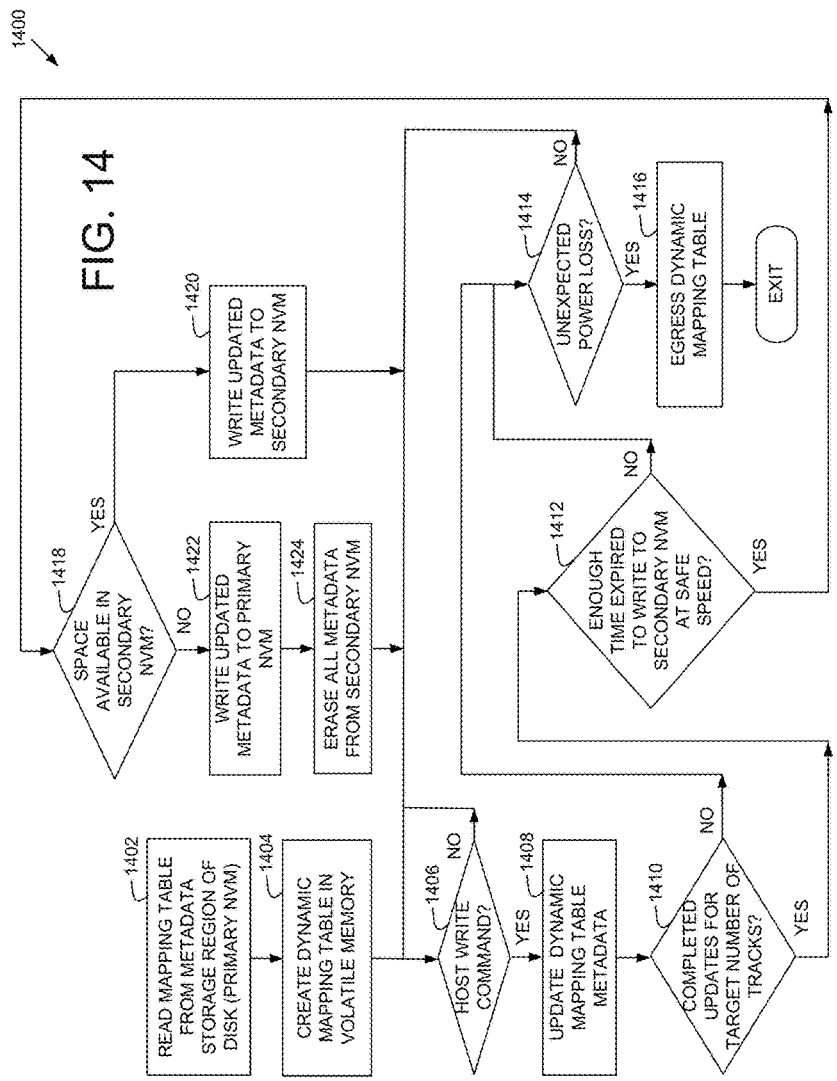

DATA STORAGE DEVICE AND METHOD FOR USING SECONDARY NON-VOLATILE MEMORY FOR TEMPORARY METADATA STORAGE

BACKGROUND

Data storage devices (such as hard disk drives (HDDs), solid-state hybrid drives (SSHDs), or solid-state drives (SSDs)) comprise non-volatile memory (NVM), which serves as primary storage location for user data received from a host, and volatile memory, which serves as a temporary storage location for host user data. In an HDD, the primary data storage location is generally provided by rotating magnetic media (one or more disks), whereas in an SSD, non-volatile solid-state memory (e.g., NAND) provides the primary data storage location. In HDDs, SSHDs, and SSDs, the temporary storage location is typically provided by DRAM.

When data is received from the host in a data storage device, it is temporarily stored in the volatile memory (e.g., DRAM) before being written to the primary storage location (e.g., a disk). Once written from the temporary storage location to the primary storage location, the host data is safe from loss resulting from an interruption (either intentional or unexpected) in power supplied to the data storage device. However, while the host data resides in the temporary storage location (e.g., DRAM), it is susceptible to loss from an interruption in supplied power.

BRIEF DESCRIPTION OF THE DRAWINGS

Data storage devices and methods that embody the various features of the invention will now be described with reference to the following drawings, in which:

FIG. 1A is a block diagram showing a data storage device including control circuitry in communication with a primary non-volatile memory (NVM), a boot code NVM, a secondary NVM for temporarily storing metadata, and volatile memory, in accordance with one embodiment of the invention.

FIG. 1B is a flow diagram showing a process in which a first condition determines when metadata associated with one or more host write commands that is accumulated in volatile memory is written to a secondary NVM, and in which a second condition determines when at least a portion of the metadata accumulated in the secondary NVM or the volatile memory is written to a primary NVM, in accordance with one embodiment of the invention.

FIG. 4A is a block diagram showing a data storage device including control circuitry in communication with a primary NVM including a disk, a secondary NVM for temporarily storing metadata, and a volatile memory, in accordance with one embodiment of the invention.

FIG. 4B is a flow diagram showing a process in which a first condition determines when metadata associated with one or more host write commands that is accumulated in volatile memory is written to a secondary NVM, and in which a second condition determines when at least a portion of the metadata accumulated in the secondary NVM or the volatile memory is written to a primary NVM, in accordance with one embodiment of the invention.

FIG. 4C is a diagram showing an example of a zone including shingled data tracks in the disk shown in FIG. 4B.

FIG. 14 is a flow diagram showing a process a process for determining when to write metadata (e.g., mapping table updates) that has accumulated in a volatile memory to a secondary NVM in a data storage device that utilizes LBA indirection for writing user data in an MBC in a primary NVM, in accordance with one embodiment of the invention.

DETAILED DESCRIPTION

Figure 2A:
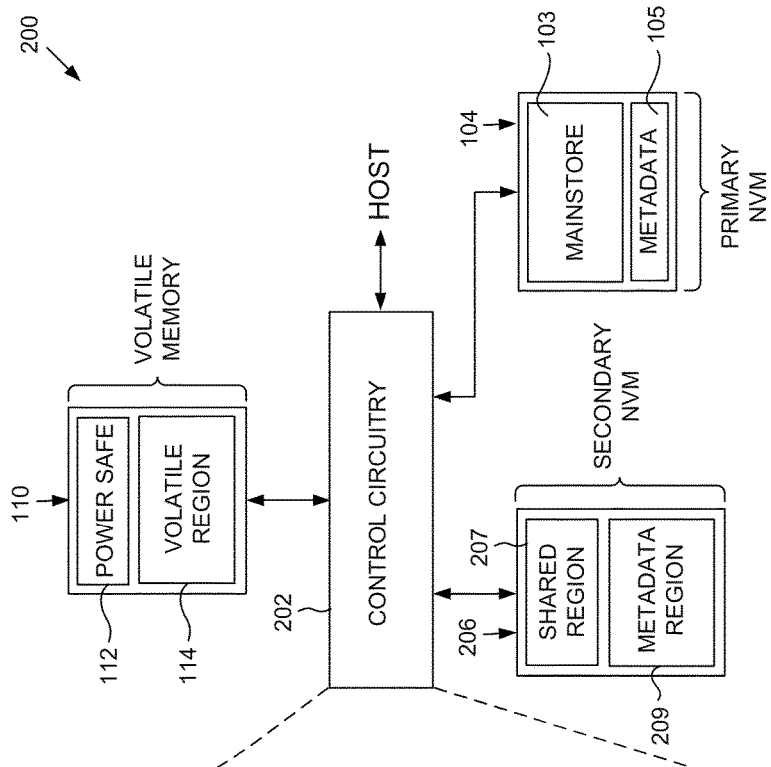
FIG. 2A is a block diagram showing a data storage device including control circuitry in communication with a primary NVM, a secondary NVM including a shared region and a metadata region, and volatile memory, in accordance with one embodiment of the invention.

Some embodiments of the invention are directed to providing a secondary NVM in a data storage device (e.g., an HDD, SSHD, or SSD) for providing temporary persistent protection for metadata that will be ultimately stored in a primary NVM. In certain embodiments, the metadata may comprise mapping table updates, zone write pointer (WP) location updates, and/or zone state table updates, or other non-user data. In one embodiment, the secondary NVM may comprise NOR memory (e.g., serial NOR flash memory). In one embodiment, the second NVM may comprise multiple memory banks, which may be situated in a single memory device or in multiple independently operable memory devices. In one embodiment, a data storage device may comprise multiple secondary NVMs for temporarily and persistently storing metadata.

In an embodiment of the invention, a data storage device may use logical block address (LBA) indirection (e.g., as in drive-managed shingled magnetic recording (SMR)) for writing user data in a primary NVM comprising a disk. For example, when LBA indirection is used for writing user data on the disk, data sectors on the disk are assessed using LBAs the dynamically mapped to physical block addresses (PBAs) representing the physical location of each data sector. In an embodiment in which drive-managed SMR is used for writing user data on the disk, the user data is written sequentially in a single direction in overlapping data tracks, a mapping table is used to map LBAs to PBAs on the disk, and metadata comprising mapping table updates associated with host write commands is temporarily stored in the secondary NVM.

In one embodiment of the invention in which host-managed SMR is implemented in a data storage device, the primary NVM comprises a disk comprising multiple zones, a zone writer pointer (WP) location table is used to store the location of the dynamic WP for each zone that is open for receiving user data from the host, and metadata comprising zone WP location table updates is temporarily stored in the secondary NVM.

In one embodiment in which a primary NVM comprises a disk comprising a media-based cache (MBC), LBA indirection is used to write user data to the MBC, a mapping table is used to map LBAs to PBAs in the MBC, and metadata comprising mapping table updates associated with host write commands is temporarily stored in the secondary NVM.

In one embodiment, metadata associated with each of one or more host write commands is written to volatile memory (e.g., DRAM), and when a first condition is met, the metadata that has accumulated in the volatile memory is written to the secondary NVM. In one embodiment, the first condition is met after a predetermined amount of time has expired after a first write of metadata to the secondary NVM. In an embodiment wherein the primary NVM comprises a plurality of zones, and wherein the metadata associated with each host write command comprises a zone WP update, the first condition is met when a number of open zones reaches a threshold. In one embodiment, the first condition is met when the host enters an idle state. In one embodiment in which the primary NVM comprises a disk comprising a plurality of data tracks, and wherein user data associated with each host write command is written to at least one of the data tracks, the first condition is met when user data has been written to a first number of the data tracks. In an embodiment, the first condition is met when an unexpected power loss to the data storage device is detected. In one embodiment, the first condition is met when the amount of metadata in the volatile memory reaches a power-safe limit of the volatile memory. For example, a power-safe limit of the volatile memory may be reached when metadata substantially fills a power-safe region of the volatile memory. In an embodiment comprising a first and a second secondary NVM, metadata that has accumulated in the volatile memory is alternately written to the first and the second secondary NVM each time the first condition is met, wherein the first and the second secondary NVMs each comprise an independently operable memory device or a memory bank.

In one embodiment, when a second condition is met, at least a portion of the metadata that has accumulated in the secondary NVM or the volatile memory is then written to the primary NVM. In one embodiment, after at least a portion of the metadata that had accumulated in the volatile memory is written to the primary NVM, the same metadata that had accumulated in the secondary NVM is erased. In one embodiment, the second condition is met when a first amount of metadata has accumulated in the secondary NVM. In one embodiment, the second condition is met when the secondary NVM is substantially full. In an embodiment, the second condition is met when the host enters an idle state or when the data storage device enters a state in which no metadata is created. In one embodiment, metadata in the secondary NVM is erased after metadata has been written to the secondary NVM according to a predetermined block ratio of metadata erased to metadata written.

Various embodiments of the invention will now be described. These embodiments are presented by way of example only, and are not intended to limit the scope of the invention. Various omissions, substitutions and changes in the form of the methods and devices described herein may be made without departing from the spirit of the invention. To illustrate some of the embodiments, reference will now be made to the figures.

FIG. 1A shows a data storage device 100 (e.g., a hard disk drive (HDD), a solid state drive (SSD), or a solid state hybrid drive (SSHD)) that provides temporary persistent storage for metadata in a secondary NVM in accordance with one embodiment of the invention. In the embodiment shown in FIG. 1A, the data storage device 100 comprises control circuitry 102, a primary NVM 104, a secondary NVM 106, a boot code NVM 108, and a volatile memory 110. In one embodiment, the control circuitry 102 is situated in a System On a Chip (SOC) in the data storage device 100. As shown in the embodiment in FIG. 1A, the control circuitry 102 is in communication with a host, and may communication with the host via a Serial ATA (SATA), Serial Attached SCSI (SAS), or a USB interface, for example.

As shown in FIG. 1A, the control circuitry 102 is also in communication with the primary NVM 104, which, in one embodiment, may comprise one or more disks (i.e., rotating magnetic media). As shown in the embodiment in FIG. 1A, the primary NVM 104 comprises a mainstore 103 for providing user data storage and a metadata storage region 105 for storing metadata (e.g., a mapping table and/or zone WP location table). In an embodiment in which the primary NVM 104 comprises a disk, the metadata storage region 105 may be located in a reserved region of the disk. In one embodiment, the primary NVM 104 may comprise one or more disks on which data sectors are accessed indirectly using LBAs dynamically mapped to PBAs representing the physical location of each data sector. In another embodiment, the primary NVM 104 may comprise zones comprising multiple data tracks, wherein the data tracks in each zone are written in a shingle manner (also known as SMR) such that a previously written track is partially overwritten. In yet another embodiment, the primary NVM may comprise one or more MBCs, wherein each MBC is situated in an over-provisioned region of a disk. In other embodiments, the primary NVM 104 may comprise solid state memory (e.g., NAND flash), or a combination of media such as rotating magnetic media and NAND flash, as in certain storage devices such as SSHDs (hybrid drives). In an embodiment in which the primary NVM 104 comprises solid state memory, the control circuitry 102 may communicate with the primary NVM 104 via, for example, a SATA, SATA Express, SAS, USB, PCI Express (PCIe), or NVM Express (NVMe) interface, or other type of interface that is compatible with solid state memory.

As shown in the embodiment shown in FIG. 1A, the control circuitry 102 is also in communication with the secondary NVM 106, which serves as a temporary persistent data storage location (data stored in the secondary NVM 106 can survive a power interruption or power loss) for metadata that is ultimately written to the primary NVM 104 from either the secondary NVM 106 or the volatile memory 110. In one embodiment, the secondary NVM 106 comprises NOR memory (e.g., serial NOR flash memory). In other embodiments, the secondary NVM 106 may comprise, for example, NAND flash memory, Magnetoresistive random-access memory (MRAM), Chalcogenide RAM (C-RAM), correlated electron RAM (CeRAM), Phase Change Memory (PC-RAM or PRAM), Programmable Metallization Cell RAM (PMC-RAM or PMCm), Ovonic Unified Memory (OUM), Resistance RAM (ReRAM), EEPROM, Ferroelectric Memory (FeRAM), or other discrete NVM chips. In an embodiment in which secondary NVM 106 comprises NOR memory, for example, the control circuitry 102 may communicate with the secondary NVM 106 via a serial peripheral interface (SPI) (not shown in FIG. 1A). In other embodiments, the control circuitry 102 may communicate with the secondary NVM 106 via a serial interface other than an SPI, or a parallel interface, depending on the type of memory that the secondary NVM 106 comprises. In one embodiment, the secondary NVM 106 may be configured as a circular buffer.

In an embodiment of the invention, the secondary NVM 106 further comprises one or more banks of memory (memory banks), wherein each memory bank may comprise one or more memory chips that are coupled together in a parallel configuration so as to increase the data rate of the memory. In an embodiment of the invention in which the secondary NVM 106 comprises multiple memory banks, the number of memory banks in the secondary NVM 106 may be selected to achieve a desired data rate for the secondary NVM 106. In one embodiment, the secondary NVM 106 may comprise two memory banks that are configured in a "ping-pong" arrangement, in which a first memory bank is used to store incoming metadata writes while a second memory bank is being erased to accept new metadata writes. In an embodiment in which first and second memory banks are configured in a ping-pong arrangement, the sustained data throughput (date rate) of the secondary NVM 106 is increased.

In the embodiment shown in FIG. 1A, the control circuitry 102 is also in communication with the boot code NVM 108, which stores code that is used to initialize the primary NVM 104 during a boot process. In one embodiment, the boot code NVM 108 comprises NOR memory (e.g., NOR flash memory). In other embodiments, the boot code NVM 108 may comprise, for example, Chalcogenide RAM (C-RAM), correlated electron RAM (CeRAM), Phase Change Memory (PC-RAM or PRAM), Programmable Metallization Cell RAM (PMC-RAM or PMCm), Ovonic Unified Memory (OUM), Resistance RAM (ReRAM), NAND memory, EEPROM, Ferroelectric Memory (FeRAM), or other discrete NVM (non-volatile memory) chips. The control circuitry 102 can communicate with the boot code NVM 108 via a SPI or other type of interface that is appropriate for the type of memory within the boot code NVM 108.

In the embodiment shown in FIG. 1A, the control circuitry 102 is also in communication with the volatile memory 110, which serves as a temporary storage location for user data and metadata. The volatile memory 110 can comprise, for example, dynamic random access memory (DRAM), static random access memory (SDRAM), or other non-persistent type of memory. The control circuitry 102 may communicate with the volatile memory 110 via, for example, a Double Date Rate (DDR), DDR type three (DDR3), or DDR type four (DDR4) interface (not shown in FIG. 1A). In the embodiment shown in FIG. 1A, the volatile memory 110 comprises a power-safe region 112 and a volatile region 114.

In the embodiment of the invention shown in FIG. 1A, when the data storage device 100 experiences an unexpected power loss, an egress process is performed using a reserve power source (e.g., reserve battery, capacitive storage, energy generated from the rotation of the primary NVM 104 (in an embodiment in which the primary NVM 104 comprises rotating magnetic storage (one or more disks)), and so on (not shown in FIG. 1A)) to briefly power the volatile memory 110 to effect an emergency transfer of data from the power-safe region 112 to the primary NVM 104 or the secondary NVM 106. During the unexpected power loss, any data (user data or metadata) stored in the volatile region 114 of the volatile memory 110 will be lost. In this manner, data written from the host to the power-safe region 112 of the volatile memory 110 can be protected from an unexpected power loss.

In the embodiment shown in FIG. 1A, the control circuitry 102 is configured to execute the flow diagram of FIG. 1B, wherein metadata and user data associated with a host write command is written to the volatile memory 110 (block 116). In various embodiments, the metadata may comprise, for example, a mapping table update (e.g., an MBC mapping table update), a zone WP location update, a zone state update, or other non-user data. As shown in the flow diagram of FIG. 1B, the control circuitry is further configured to write the user data to the primary NVM 104 (block 118), and continue to write metadata associated with each of one or more host write commands to the volatile memory 110, and when a first condition is met, write the metadata that has accumulated in the volatile memory 110 to the secondary NVM 106 (block 120).

In one embodiment, the first condition is met after a predetermined amount of time has expired after a first write of metadata to the secondary NVM 106. In an embodiment in which the metadata comprises mapping table updates, the first condition may be met when the volatile memory 110 receives a first number of mapping table updates. In an embodiment in which the primary NVM 104 comprises a disk comprising a plurality of zones, and wherein the metadata associated with each host write command comprises a zone write pointer update, the first condition may be met when a number of open zones reaches a threshold. In an embodiment in which the primary NVM 104 comprises a metadata storage region, prior to receiving the host write command, the control circuitry 102 is further configured to create one or more tables in the volatile memory 110 for zone WP locations. In one embodiment, the first condition is met when the host enters an idle state.

In an embodiment in which the primary NVM 104 comprises a disk comprising a plurality of data tracks, the control circuitry 102 is further configured to write user data associated with each host write command to at least one of the data tracks, and the first condition is met when the control circuitry 102 has written user data to a first number of data tracks. In an embodiment in which the primary NVM 104 comprises a disk comprising a plurality of data tracks, the control circuitry 102 is further configured to write user data associated with each host write command to at least one of the data tracks, and the first condition is based on a rate of metadata generated relative to a throughput of the secondary NVM 106. In one embodiment, the first condition is met when the control circuitry 102 detects an unexpected power loss to the data storage device. In one embodiment, the first condition is met when the amount of metadata in the volatile memory 110 reaches a power-safe limit of the volatile memory 110. In an embodiment, the power-safe limit of the volatile memory 110 may be reached when the power-safe region 112 of the volatile memory 110 is substantially filled with data. In an embodiment, when the first condition is met, an amount of metadata that has accumulated in the volatile memory 110 that is written to the secondary NVM 106 is the amount of metadata that exceeds the power-safe limit of the volatile memory 110.

In the embodiment shown in FIG. 1B, the control circuitry 102 is further configured to repeat block 120 of the flow chart until a second condition is met, and then write at least a portion of the metadata that as accumulated in the secondary NVM 106 or the volatile memory 110 to the primary NVM 104 (block 122). In one embodiment, the second condition is met when a first amount of metadata has accumulated in the secondary NVM 106. In one embodiment, the second condition is met when the secondary NVM 106 is substantially full. In one embodiment, the second condition is met when the host enters an idle state or when the data storage device 100 enters a state in which no metadata is created. For example, the data storage device 100 may enter a state in which no metadata is created when write commands are not being received from the host.

FIG. 2A shows a data storage device 200 (e.g., an HDD, an SSD, or an SSHD) that provides temporary persistent storage for metadata in a secondary NVM in accordance with one embodiment of the invention. A difference between the embodiment shown in FIG. 2A and the embodiment shown in FIG. 1A is that the secondary NVM 206 in the data storage device 200 in the embodiment shown in FIG. 2A comprises a shared region 207 and a metadata region 209. In the embodiment shown in FIG. 2A, the shared region 207 of the secondary NVM 206 provides, for example, persistent storage for boot code (as previously discuss in the embodiment in FIG. 1A) and/or code related to other functions of the data storage device 200. In the embodiment shown in FIG. 2A, the metadata region 209 of the secondary NVM 206 provides temporary persistent storage for metadata associated with write commands received from the host. In the embodiment in FIG. 2A, the control circuitry 202 is in communication with the shared region 207 and the metadata region 209 of the secondary NVM 206 via a similar type of interface (not shown in FIG. 2A) as previously discussed with respect to the secondary NVM 106 in the embodiment in FIG. 1A. Also, the secondary NVM 206 in the embodiment shown in FIG. 2A may comprise similar types of memory as the secondary NVM 106 in the embodiment in FIG. 1A.

Figure 2B:
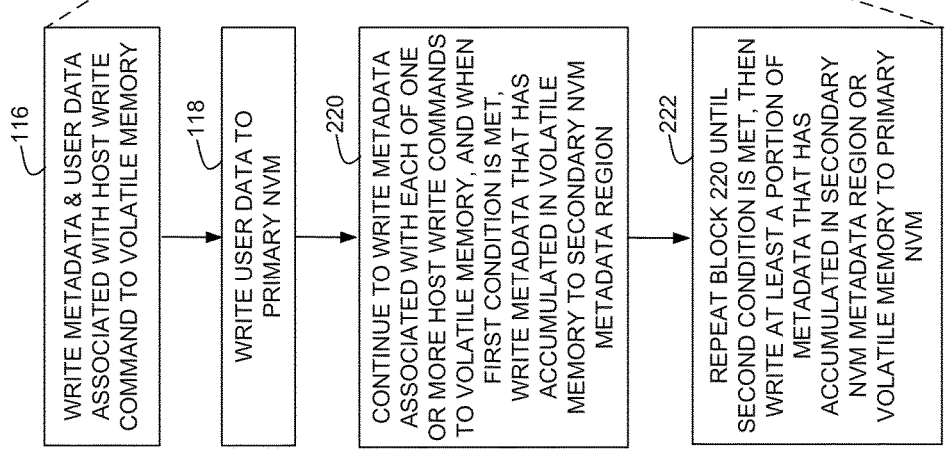
FIG. 2B is a flow diagram showing a process in which a first condition determines when metadata associated with one or more host write commands that is accumulated in volatile memory is written to a metadata region of a secondary NVM, and in which a second condition determines when at least a portion of the metadata accumulated in the secondary NVM metadata region or the volatile memory is written to a primary NVM, in accordance with one embodiment of the invention.

In the embodiment shown in FIG. 2A, the control circuitry 202 is configured to execute the flow diagram of FIG. 2B. The flow chart in the embodiment in FIG. 2B is similar to the flow chart in the embodiment in FIG. 1B, except for the following differences (noted in quotation marks). In block 220 of the flow chart in FIG. 2B, when the first condition is met, the control circuitry 202 is configured to write metadata that has accumulated in the volatile memory 110 to "the metadata region 209 of the secondary NVM 206." Also, in block 222 of the flow chart in FIG. 2B, the control circuitry 202 is configured to repeat block 220 until a second condition is met, then write at least a portion of the metadata that has accumulated in "the metadata region 209 of the secondary NVM 206" or the volatile memory 110 to the primary NVM 104.

Figure 3A:
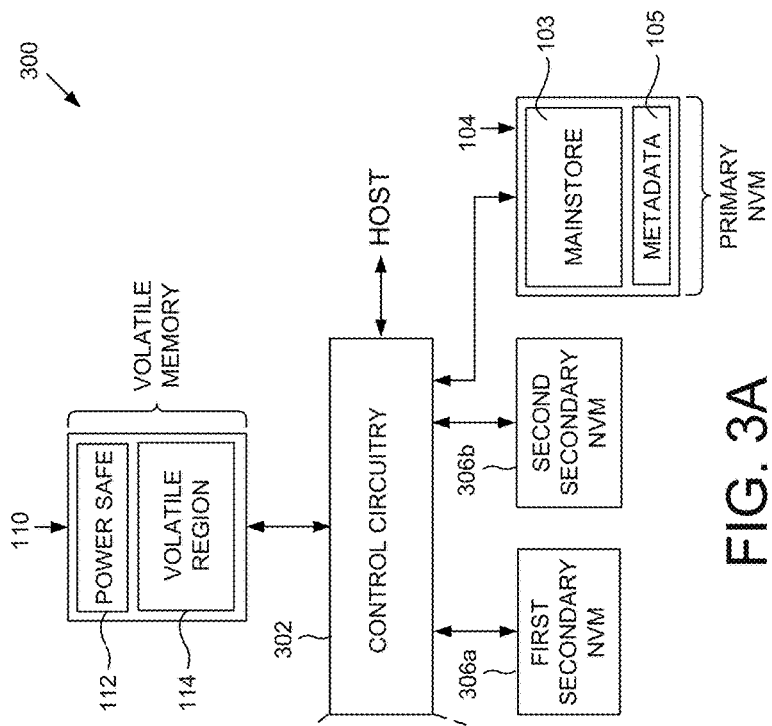
FIG. 3A is a block diagram showing a data storage device including control circuitry in communication with a primary NVM, a first and a second secondary NVM for temporarily storing metadata, and volatile memory, in accordance with one embodiment of the invention.

FIG. 3A shows a data storage device 300 (e.g., an HDD, an SSD, or an SSHD) that provides temporary persistent storage for metadata in a secondary NVM in accordance with one embodiment of the invention. A difference between the embodiment shown in FIG. 3A and the embodiment shown in FIG. 1A is that in the embodiment shown in FIG. 3A, the data storage device 300 comprises two secondary NVMs—a first secondary NVM 306a and a second secondary NVM 306b. As shown in the embodiment in FIG. 3A, the control circuitry 302 is in communication with the first secondary NVM 306a and the second secondary NVM 306b. In the embodiment in FIG. 3A, the first secondary NVM 306a and the second secondary NVM 306b are independently operable memory devices. In an embodiment, a portion of the first or second secondary NVM 306a, 306b comprises boot code for the primary NVM 106. In one embodiment, each of the first and second secondary NVMs 306a, 306b comprises an independently operable memory device or a memory bank. In one embodiment, the first and second secondary NVMs 306a, 306b may be situated in the same chip. In another embodiment, the first and second secondary NVMs 306a, 306b may be situated in a multi-chip module (MOM).

In the embodiment shown in FIG. 3A, the first and second secondary NVMs each provide the same function as the secondary NVM 106 in the embodiment in FIG. 1A—providing temporary persistent storage for metadata associated with write commands received from the host. In the embodiment in FIG. 3A, the control circuitry 302 is in communication with each of the first and second secondary NVMs 306a, 306b via a similar type of interface (not shown in FIG. 3A) as previously discussed with respect to the secondary NVM 106 in the embodiment in FIG. 1A. Also, the first and second secondary NVMs 306a, 306b in the embodiment shown in FIG. 3A may each comprise similar types of memory as the secondary NVM 106 in the embodiment in FIG. 1A.

Figure 3B:
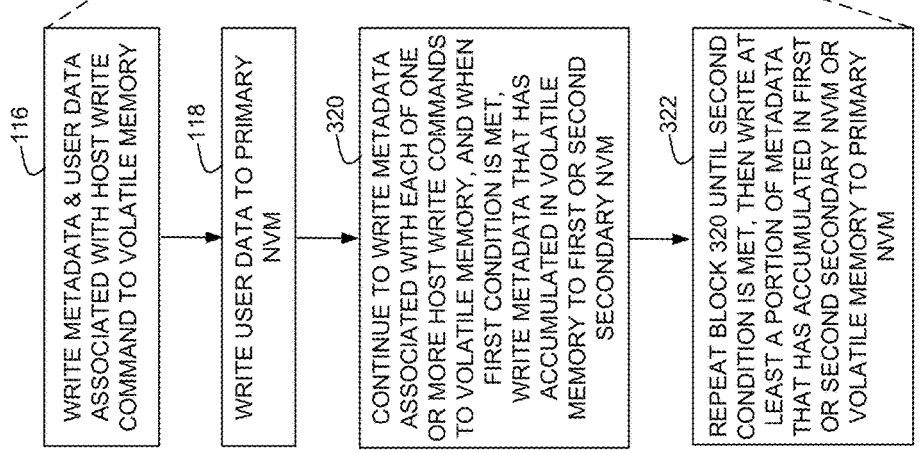
FIG. 3B is a flow diagram showing a process in which a first condition determines when metadata associated with one or more host write commands that is accumulated in volatile memory is written to a first or a second secondary NVM, and in which a second condition determines when at least a portion of the metadata accumulated in the first or the second secondary NVM or the volatile memory is written to a primary NVM, in accordance with one embodiment of the invention.

In the embodiment shown in FIG. 3A, the control circuitry 302 is configured to execute the flow diagram of FIG. 3B. The flow chart in the embodiment in FIG. 3B is similar to the flow chart in the embodiment in FIG. 1B, except for the following differences (noted in quotation marks). In block 320 of the flow chart in FIG. 3B, when the first condition is met, the control circuitry 302 is configured to write metadata that has accumulated in the volatile memory 110 "to the first or second secondary NVM 306a, 306b." In one embodiment, the control circuitry 302 is configured to alternately write metadata that has accumulated in the volatile memory 110 each time the first condition is met. In one embodiment, the control circuitry 302 is configured to erase metadata in the first secondary NVM 306a when writing metadata to the second secondary NVM 306b, and vice versa. In an embodiment of the invention, each time the first condition is met, the control circuitry 302 is further configured to write metadata that has accumulated in the volatile memory 110 to the first secondary NVM 306a until it is substantially full, and then write metadata that has accumulated in the volatile memory 110 to the second secondary NVM 306b. Also, in block 322 of the flow chart in FIG. 3B, the control circuitry 302 is configured to repeat block 320 until a second condition is met, then write at least a portion of the metadata that has accumulated in "the first or second secondary NVM 306a, 306b" or the volatile memory 110 to the primary NVM 104.

FIG. 4A shows a data storage device 400 (e.g., an HDD or an SSHD) that provides temporary persistent storage for metadata in a secondary NVM in accordance with one embodiment of the invention. FIG. 4A shows an embodiment of the invention in which the primary NVM 404 in the data storage device 400 comprises a disk 424. In the embodiment shown in FIG. 4A, the data storage device 400 further comprises a head 426 actuated radially over the disk 424 by an actuator arm 428, and a voice coil motor (VCM) 430 configured to rotate the actuator arm 428 about a pivot. The disk 424 comprises a plurality of zones $432_1$-$432_M$, wherein each zone $432_i$, comprises a respective plurality of data tracks $434_1$-$434_M$. Thus, for example, zone $432_1$ comprises a plurality of data tracks $434_1$, zone $432_2$ comprises a plurality of tracks $434_2$, and so forth. Each of the pluralities of data tracks $434_1$-$434_M$ in each respective zone $432_1$-$432_M$ can be used by the host for reading and writing data. The plurality of zones $432_1$-$432_M$ extends between an outer diameter (OD) 436 and an inner diameter (ID) 438 of the disk 424.

Referring to the embodiment shown in FIG. 4C, the data tracks $434_i$ in each zone $432_i$ are written in a shingled manner such that a previously written track is partially overwritten. In the embodiment in FIG. 4C, each data track $434_i$ comprises a plurality of data sectors $435_i$ that are used for storing data and are accessed indirectly using LBAs mapped to PBAs representing the physical location of each data sector. In one embodiment, each zone $432_i$ may be written as a circular buffer. For example, the circular buffer may be written from the beginning of the zone $432_i$ (e.g., toward the data track $434_i$ closest to the outer diameter 436 of the disk 424) toward the end of the zone $432_i$ (e.g., toward the data track $434_i$ closest to the inner diameter 438 of the disk 424), and then circle back to the beginning of the zone $432_i$. Data is written to the head of the circular buffer such that the LBAs of new write commands are mapped to the PBAs of the corresponding data sectors. When the same LBA is written by the host, the data is written to a new PBA at the head of the circular buffer and the old PBA is marked invalid so that it may be overwritten. During a garbage collection operation, valid PBAs previously written in the circular buffer may be relocated to the head of the circular buffer so that the old PBAs may be overwritten.

Referring to the embodiment shown in FIG. 4A, the disk 424 also comprises a metadata storage region (not shown in FIG. 4A) for storing metadata (e.g., a mapping table, zone WP location table, and zone state table). For example, a zone state table may include information about each zone (e.g., whether the zone is open, closed, full of data, read only, etc.). For example, the metadata storage region may be located near the outer diameter 436 or the inner diameter 438 of the disk 424, or anywhere between the outer diameter 436 and the inner diameter 438 in a reserved region of the disk 424.

In the embodiment shown in FIG. 4A, a plurality of embedded servo sectors $440_0$-$440_N$ are recorded on the disk 424 to define the pluralities of data tracks $434_1$-$434_M$, wherein each servo sector comprises suitable position information, such as a track address providing coarse position information and servo bursts providing fine position information. As shown in the embodiment in FIG. 4A, the data storage device 400 further comprises control circuitry 402. As the head passes over a servo sector, the control circuitry 402 demodulates a read signal 442 emanating from the head into a position error signal (PES). The PES is filtered by a suitable compensation filter to generate a control signal 444 applied to the VCM 430. The VCM 430 rotates the actuator arm 428 about the pivot in order to position the head 426 radially over the disk 424 in a direction that reduces the PES.

In the embodiment in FIG. 4A, the disk 424 is rotated by a spindle motor 446 at a rotational speed that is controlled by the control circuitry 402, for example, a motor driver of the control circuitry 402, via motor control signal 448. In the embodiment in FIG. 4A, the control circuitry 402 also generates a control signal 450 applied to a microactuator 452 in order to actuate the head 426 over the disk 424 in fine movements. Any suitable microactuator 452 may be employed in various embodiments of the invention, such as a piezoelectric actuator. In addition, the microactuator 452 may actuate the head 426 over the disk 424 in any suitable manner, such as by actuating a suspension relative to the actuator arm, or actuating a slider relative to the suspension. The servo sectors $440_0$-$440_N$ may comprise any suitable head position information, such as a track address for coarse positioning and servo bursts for fine positioning. The servo bursts may comprise any suitable pattern, such as an amplitude-based servo pattern or a phase-based servo pattern.

In the embodiment shown in FIG. 4A, the control circuitry 402 is configured to execute the flow diagram of FIG. 4B. The flow chart in the embodiment in FIG. 4B is similar to the flow chart in the embodiment in FIG. 1B and, as such, will not be described herein to preserve brevity.

Figure 5:
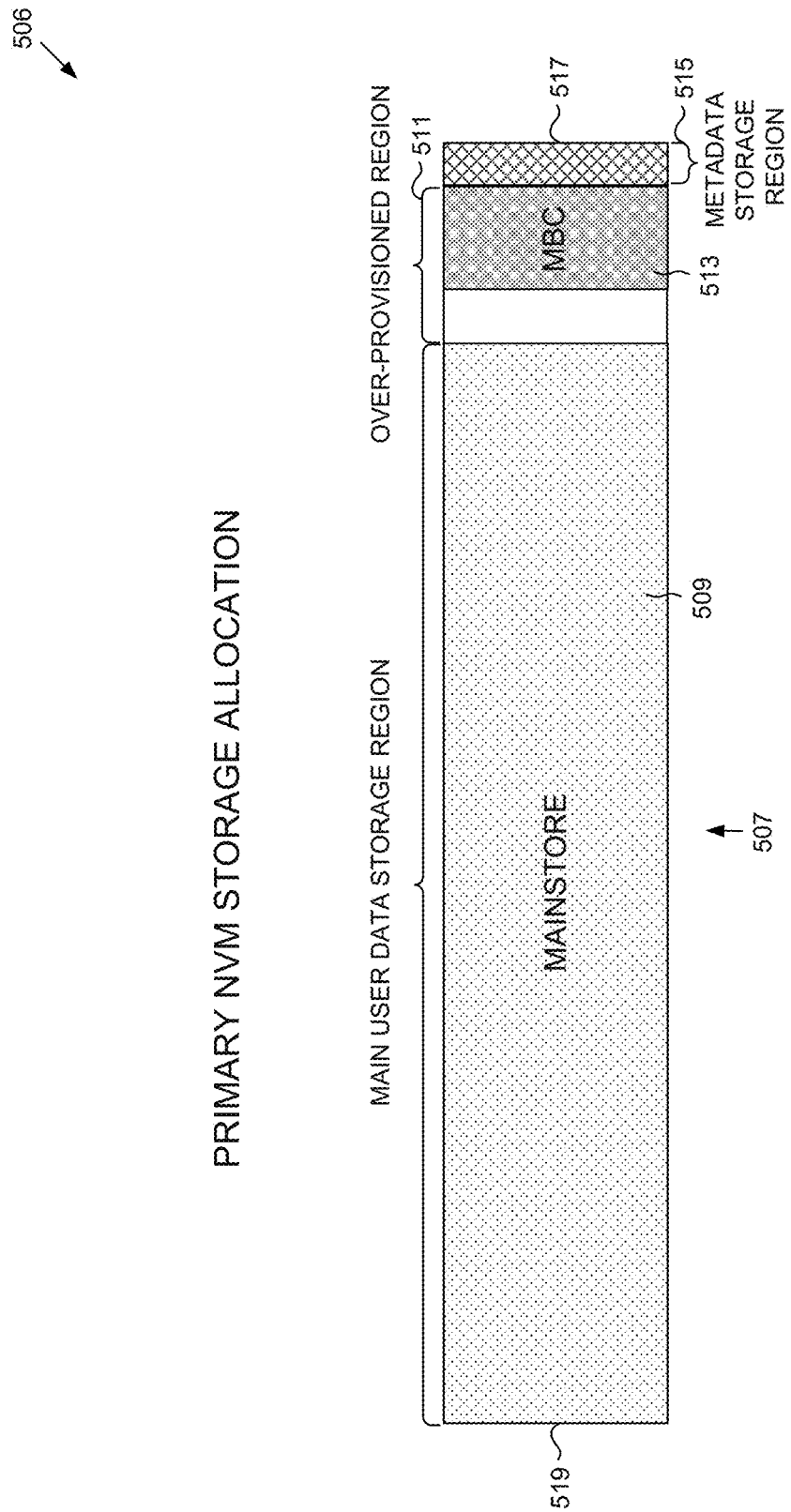
FIG. 5 is a block diagram showing an example of a primary NVM including a disk including a mainstore and a media-based cache (MBC) for storing user data and a metadata storage region.

FIG. 5 shows an example of a primary NVM 506 comprising a disk 507 that comprises an MBC (media-based cache) as used in various embodiments of the invention. As shown in FIG. 5, the disk 507 comprises a mainstore 509, which is the main user data storage region in the data storage device in which the disk 507 resides, and an over-provisioned region 511 comprising MBC 513, which may be used as a cache for write commands, such as non-sequential write commands, that are received from a host. As shown in FIG. 5, the MBC 513 is situated near the outer diameter 517 of the disk 507 and is used as a temporary storage location for user data that is addressed via dynamically mapped LBAs. Although the MBC 513 is located near the outer diameter 517 of the disk 507 in the example shown in FIG. 5, it may also be located in an over-provisioned region at the inner diameter 519 of the disk 507, or in one or more over-provisioned regions situated between the outer and inner diameters 517, 519.

The disk 507 further comprises a metadata storage region 515 for storing a mapping table (not shown in FIG. 5) for tracking the location of data in the MBC 513. Metadata comprising updates for the MBC mapping table may be temporarily stored in the secondary NVM 106 according to various embodiments of the invention, such as embodiments of the invention shown in FIGS. 1A-1B, 2A-2B, and 3A-3B.

Figure 6:
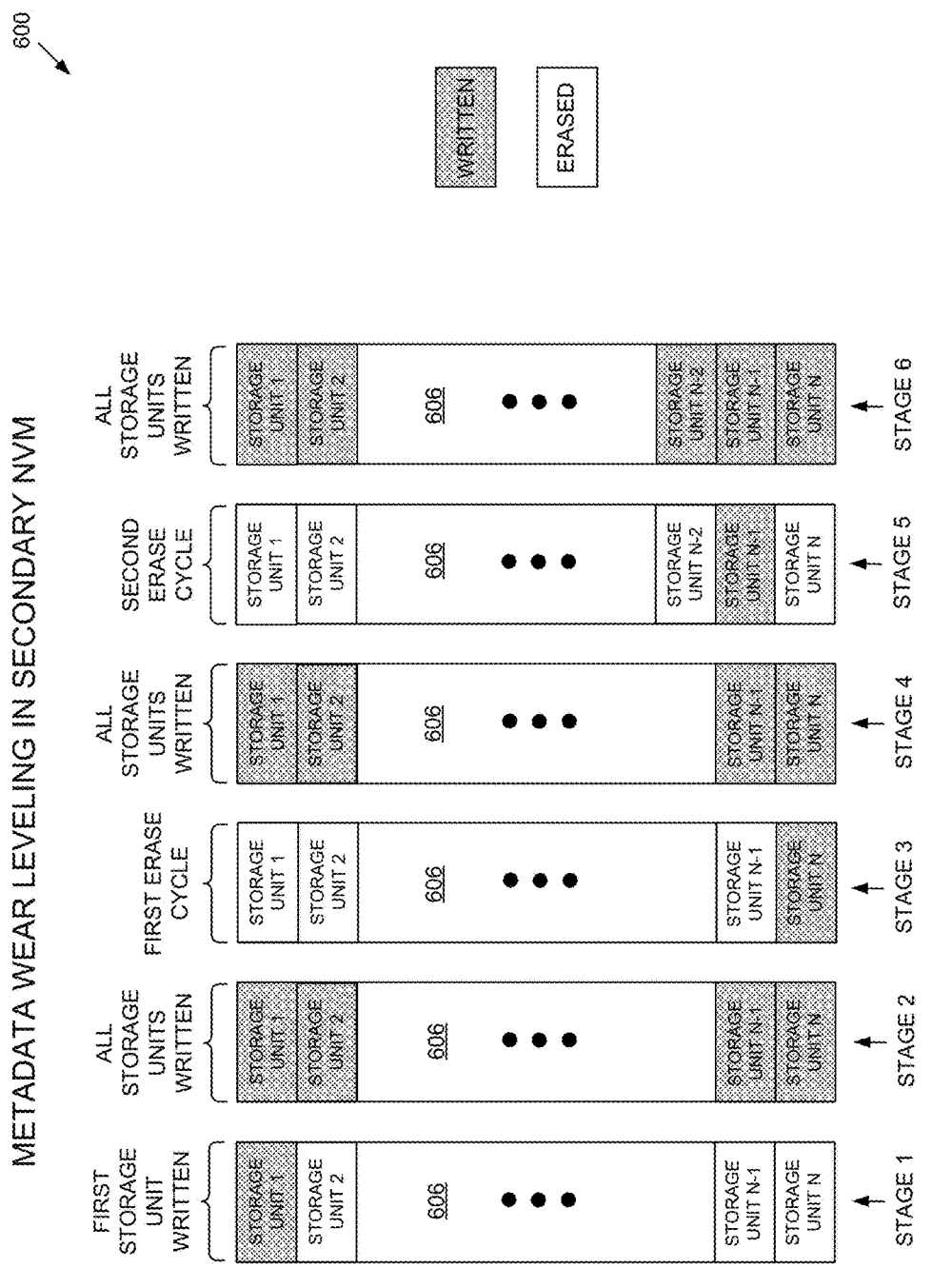
FIG. 6 is a block diagram showing metadata wear leveling in a secondary NVM in accordance with one embodiment of the invention.

FIG. 6 shows a metadata wear leveling process 600 for a secondary NVM in accordance with one embodiment of the invention. In the embodiment shown in FIG. 6, the metadata wear leveling process 600 shows the secondary NVM 606 in six example stages of wear leveling, in which the process progresses in time from stage 1 to stage 6. As shown in the embodiment in FIG. 6, the secondary NVM 606 comprises N storage units. In one embodiment, each storage unit may comprise a page of memory, wherein each page may comprise, for example, 256 bytes of metadata. In the metadata wear leveling process shown in FIG. 6, a storage unit that is written with metadata is indicated by a shaded rectangle and a storage unit that is erased is indicated by a clear rectangle.

As shown in FIG. 6, at stage 1 only storage unit 1 has been written (i.e., filled) with metadata; at stage 2, all N storage units have been written with metadata; at stage 3 the first erase cycle has been completed, wherein storage units 1 through N−1 have been erased and only storage unit N has not been erased; at stage 4, storage units 1 through N have all been written with metadata; at stage 5, the second erase cycle has been completed, in which storage units 1 through N−2 and N have been erased and only storage unit N−1 has not been erased; and at stage 6, all N storage units have been written with metadata, as in stage 2. In the embodiment in FIG. 6, during each erase cycle (only two are shown to preserve brevity) only one different storage unit is not erased. In another embodiment, two or more different storage units may be left un-erased (remain filled with metadata) during each erase cycle.

Figure 7:
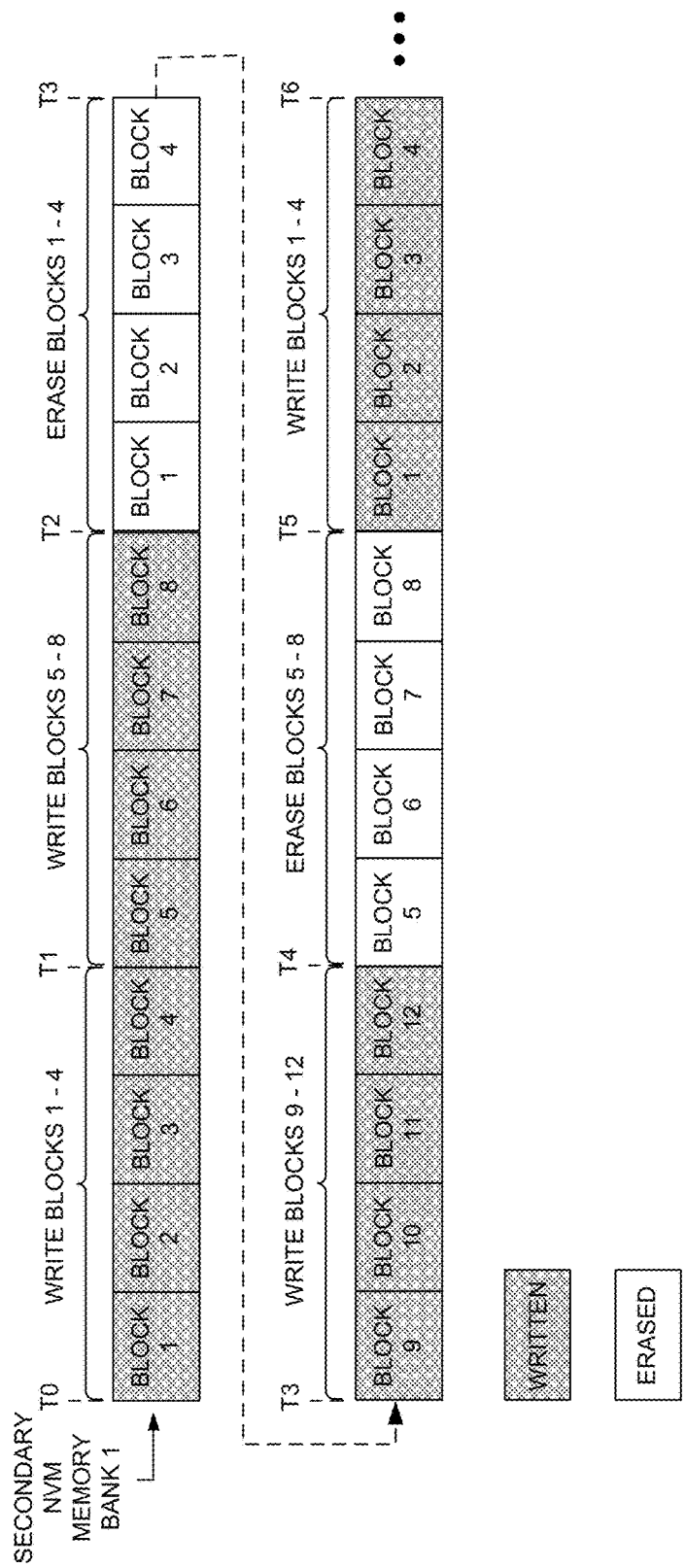
FIG. 7 is a diagram showing metadata write/erase timing for a single memory bank in a secondary NVM in accordance with one embodiment of the invention.

FIG. 7 shows a metadata write/erase timing diagram 700 for a single memory bank in a secondary NVM in accordance with one embodiment of the invention. In the embodiment shown in FIG. 7, timing diagram 700 shows write/erase timing for secondary NVM memory bank 1 from time T0 through time T6. As shown in FIG. 7, the secondary NVM memory bank 1 comprises blocks 1-12 for storing metadata, wherein a block that is written with metadata is indicated by a shaded rectangle and a block that is erased is indicated by a clear rectangle. Each block may have a metadata storage capacity of 32 KB, 64 KB, 256 KB, or greater, for example. In various embodiments, after a block in a secondary NVM 106 has been written, it is necessary to erase the block before it can be written again. In one embodiment, metadata in the secondary NVM 106 is erased after metadata has been written to the secondary NVM 106 according to a predetermined block ration of metadata erased to metadata written.

In the timing diagram 700 in FIG. 7, blocks 1-4 are written from time T0-T1, blocks 5-8 are written from time T1-T2, blocks 1-4 are erased from time T2-T3, blocks 9-12 are written from time T3-T4, blocks 5-8 are erased from time T4-T5, blocks 1-4 are written from time T5-T6, and so forth. Thus, in the embodiment shown in FIG. 7, two groups of four blocks each (blocks 1-4 and blocks 5-8) are written, followed by an alternating pattern of erasing and writing a group of four blocks. In another embodiment, a different number of blocks in a memory bank in a secondary NVM may be written before any blocks are erased. In another embodiment, there may be a different pattern of writing and erasing blocks in a memory bank in a secondary NVM. In one embodiment, all of the blocks in a bank of memory in a secondary NVM may be written, and then all of the blocks may be erased before any of the blocks are rewritten.

Figure 8:
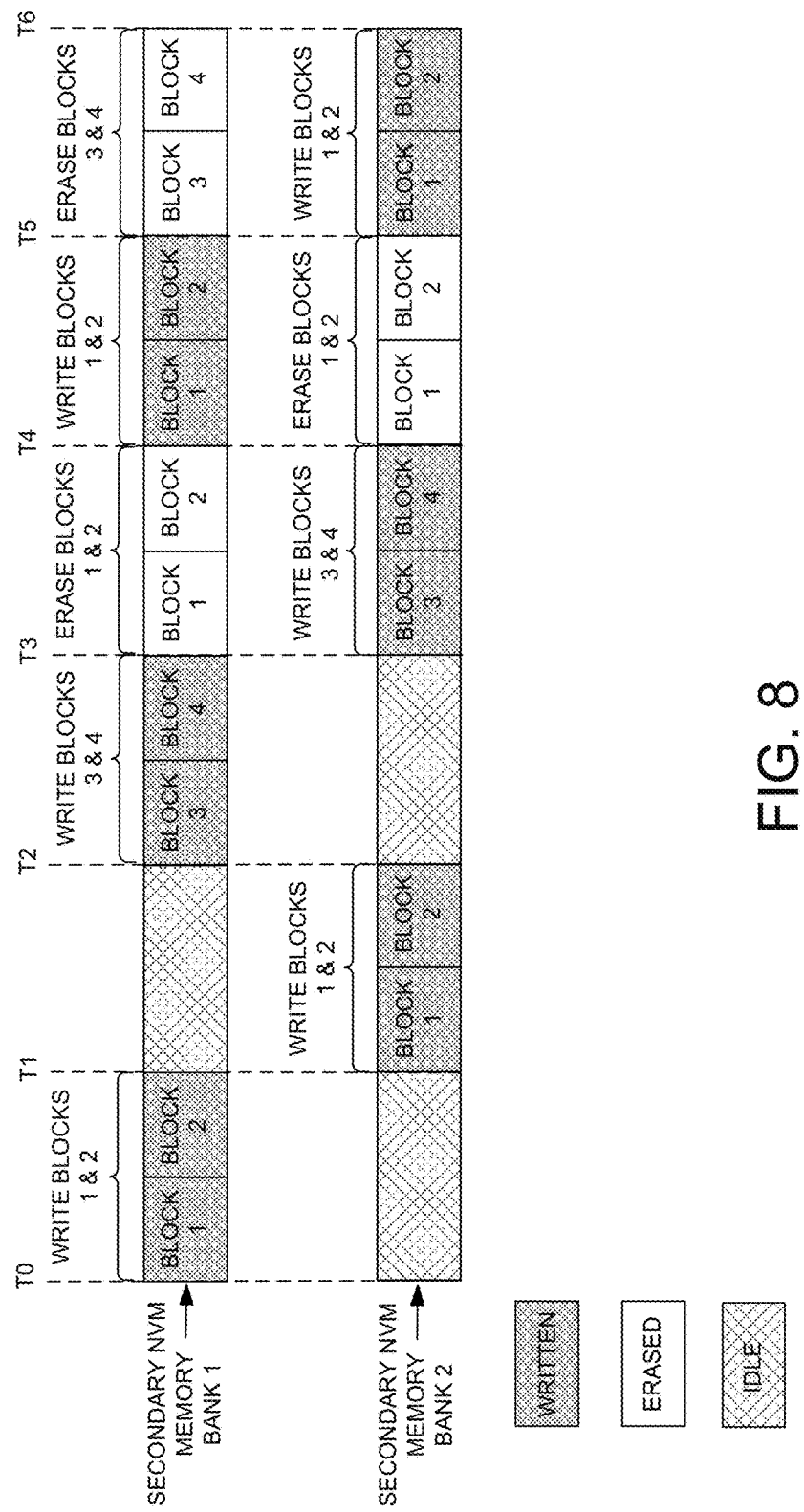
FIG. 8 is a diagram showing metadata write/erase timing for two memory banks in a secondary NVM in accordance with one embodiment of the invention.

FIG. 8 shows a metadata write/erase timing diagram 800 for two memory banks in a secondary NVM in accordance with one embodiment of the invention. In the embodiment shown in FIG. 8, secondary NVM memory banks 1 and 2 each comprise four blocks for storing metadata, in which the four blocks are written and erased in groups of two blocks. As shown in the embodiment in FIG. 8, a written block is indicated by a shaded block, an erased block is written by a clear block, and an idle state of a memory bank is indicated by a cross-hatched pattern. In the embodiment in FIG. 8, memory banks 1 and 2 are each independently operable via, for example, a separate SPI, such that the control circuitry can write to memory bank 1 while erasing memory bank 2, and vice versa. In one embodiment, each memory bank 1 and 2 is situated in a different memory device. In another embodiment, each memory bank 1 and 2 is situated in the same memory device.

In the timing diagram 800 in FIG. 8, during time interval T0-T1, blocks 1 and 2 in memory bank 1 are written with metadata while memory bank 2 is in an idle state (i.e., inactive); during time interval T1-T2, memory bank 1 is idle while blocks 1 and 2 in memory bank 2 are written with metadata; during time interval T2-T3, blocks 3 and 4 in memory bank 1 are written with metadata while memory bank 2 is idle; during time interval T3-T4, blocks 1 and 2 in memory bank 1 are erased while blocks 3 and 4 in memory bank 2 are written with metadata; during time interval T4-T5, blocks 1 and 2 in memory bank 1 are written with metadata, while blocks 1 and 2 in memory bank 2 are erased; and during time interval T5-T6, blocks 3 and 4 in memory bank 1 are erased while banks 1 and 2 in memory bank 2 are written with metadata. In another embodiment, a secondary NVM may comprise more than two independently operable memory banks, wherein each memory bank comprises one or more blocks that can be independently written to and erased with respect to blocks in the other memory banks.

Figure 9:
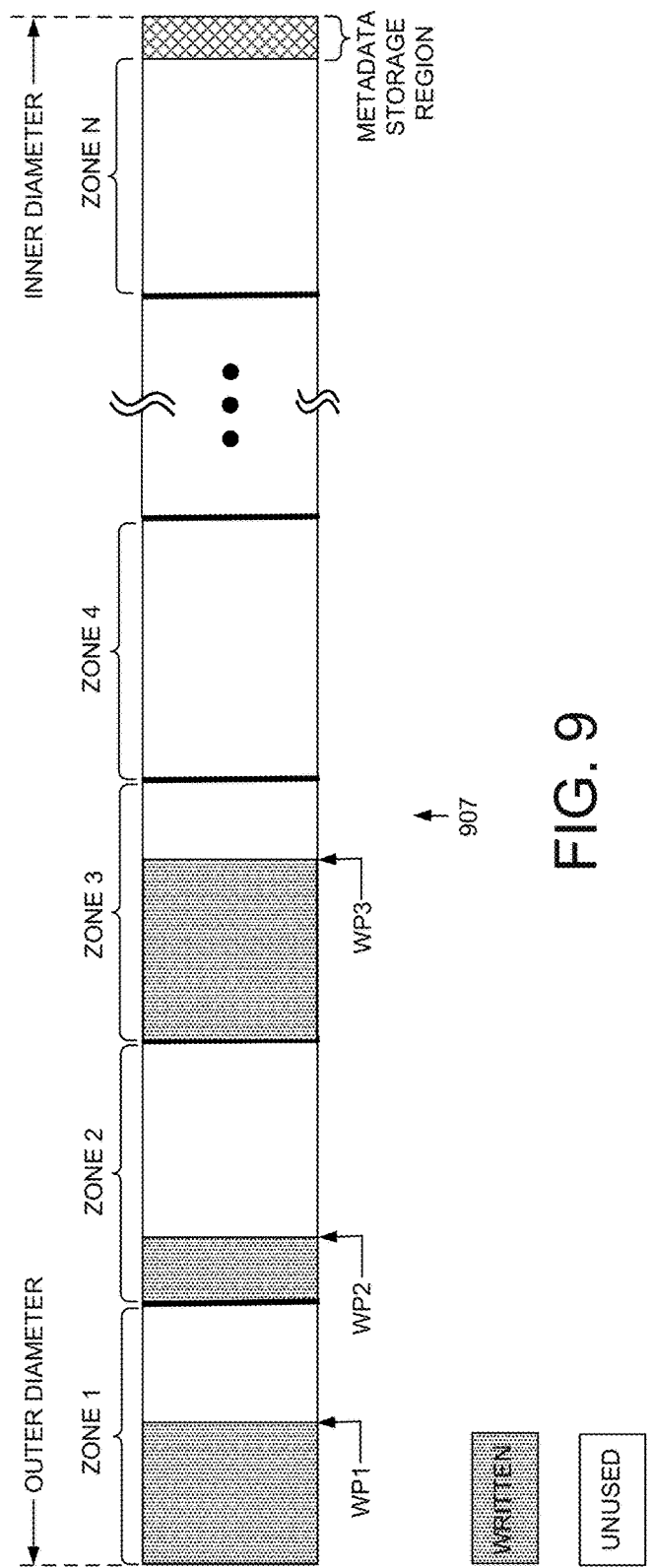
FIG. 9 is a diagram showing an example of a primary NVM including a disk including multiple zones, zone write pointers (WP), and a metadata storage region.

FIG. 9 shows an example of a primary NVM 906 comprising a disk 907 including zone WPs for SMR zones (e.g., drive-managed or host-managed SMR). In the example of the primary NVM 906 shown in FIG. 9, the disk 907 comprises N zones for storing data, wherein a zone or a portion of a zone that is currently unused (i.e., has not been written to as yet) is indicated by a clear rectangle, and a zone or a portion of a zone that has been written to is indicated by a shaded rectangle. In the disk 907 in the example in FIG. 9, the host can beginning writing data at the beginning of an unused zone, such as zone 4. However, once data has been written to a portion of a zone, a zone WP may be used to indicate the location in that zone at which the host can start writing. Thus, in disk 907 in FIG. 9, zone WP1, WP2, and WP3 indicate the location in respective zones 1, 2, and 3 at which the host can start writing. In the example in FIG. 9, the disk 907 further comprises a metadata storage region, which may be used for storing a zone WP location table.

Figure 10:
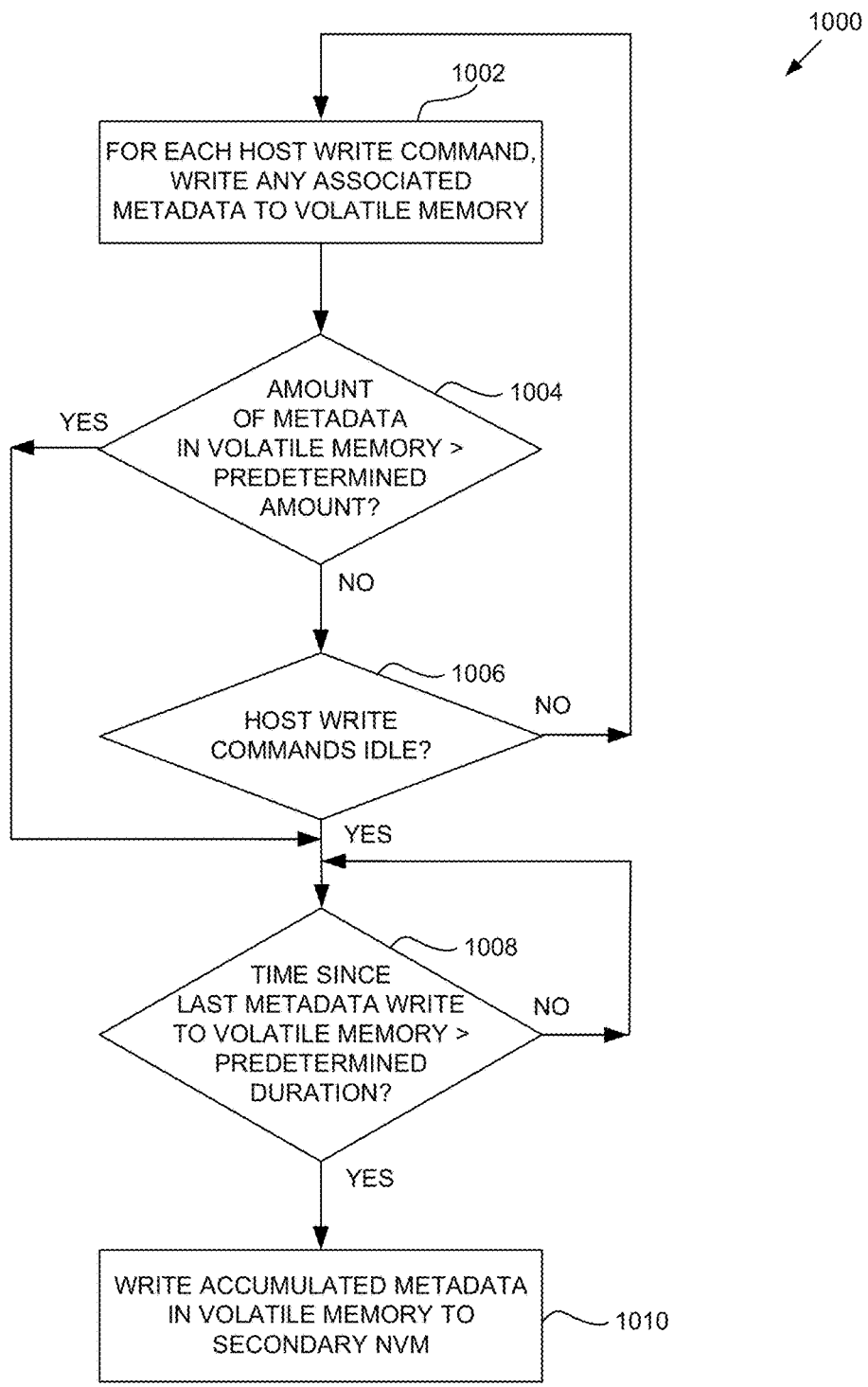
FIG. 10 is a flow diagram showing a process for determining when to write metadata that has accumulated in a volatile memory to a secondary NVM in accordance with one embodiment of the invention.

FIG. 10 shows a process 1000 for determining when to write metadata that has accumulated in a volatile memory 110 (FIG. 1A-4A) to a secondary NVM 106 (FIG. 1A, 4A), 206, (FIG. 2A), 306a, 306b (FIG. 3A) in a data storage device 100-400 (FIG. 1A-4A), in accordance with one embodiment of the invention. The process 1000 can be implemented by the control circuitry 102 (FIG. 1A), 202 (FIG. 2A), 302 (FIG. 3A), 402 (FIG. 4A) of the data storage device 100-400 (FIG. 1A-4A) (e.g., a hard disk drive (HDD) or a hybrid disk drive (SSHD)). In one embodiment, the process 1000 can be implemented in a data storage device 400 (FIG. 4A) using LBA indirection (e.g., SMR) for writing data in a primary NVM 404 (FIG. 4A) comprising a disk 424 (FIG. 4A). In another embodiment, the process 1000 can be implemented in a data storage device comprising a primary NVM 506 (FIG. 5) comprising a disk 507 comprising an MBC 513 (FIG. 5). In one embodiment, the process 1000 may begin when a write command is received from a host.

The process 1000 starts in block 1002 where, for each host write command received, any associated metadata is written to the volatile memory. The metadata may comprise, for example, a mapping table update, such as an update for a MBC mapping table. In block 1004, the process 1000 determines if the amount of metadata in the volatile memory is greater than a predetermined amount. In one embodiment, the predetermined amount of metadata is the amount of metadata corresponding to a predetermined number of mapping table updates to a mapping table. In one embodiment, the predetermined amount of metadata is the amount of metadata in the volatile memory that is safe via an egress process (as previously described) from an unexpected power loss (e.g., the amount of metadata that power safe region 112 of the volatile memory 110 can hold). When the process 1000 determines that the amount of metadata in the volatile memory is not greater than the predetermined amount, and the process 1000 determines in block 1006 that the host write commands are not idle, the process returns to block 1002.

When the amount of metadata in the volatile memory 110 is greater than the predetermined amount or the host write commands are idle, the process 1000 determines in block 1008 if the time since the last metadata write to the secondary NVM is greater than a predetermined duration, and if so, the process 1000 writes in block 1010 the accumulated metadata in the volatile memory to the secondary NVM. In one embodiment, the predetermined duration is based on a rate of metadata generated relative to a throughput of the secondary NVM. In one embodiment, the predetermined duration corresponds to a time required to write user data to a predetermined amount of data tracks in a primary NVM 404 (FIG. 4) (a disk 424) in the data storage device 400 (FIG. 4). When, the time since the last metadata write is not greater than the predetermined duration, the process 1000 continues to execute block 1008 until the time since the last metadata write to the secondary NVM is greater than the predetermined duration.

Figure 11:
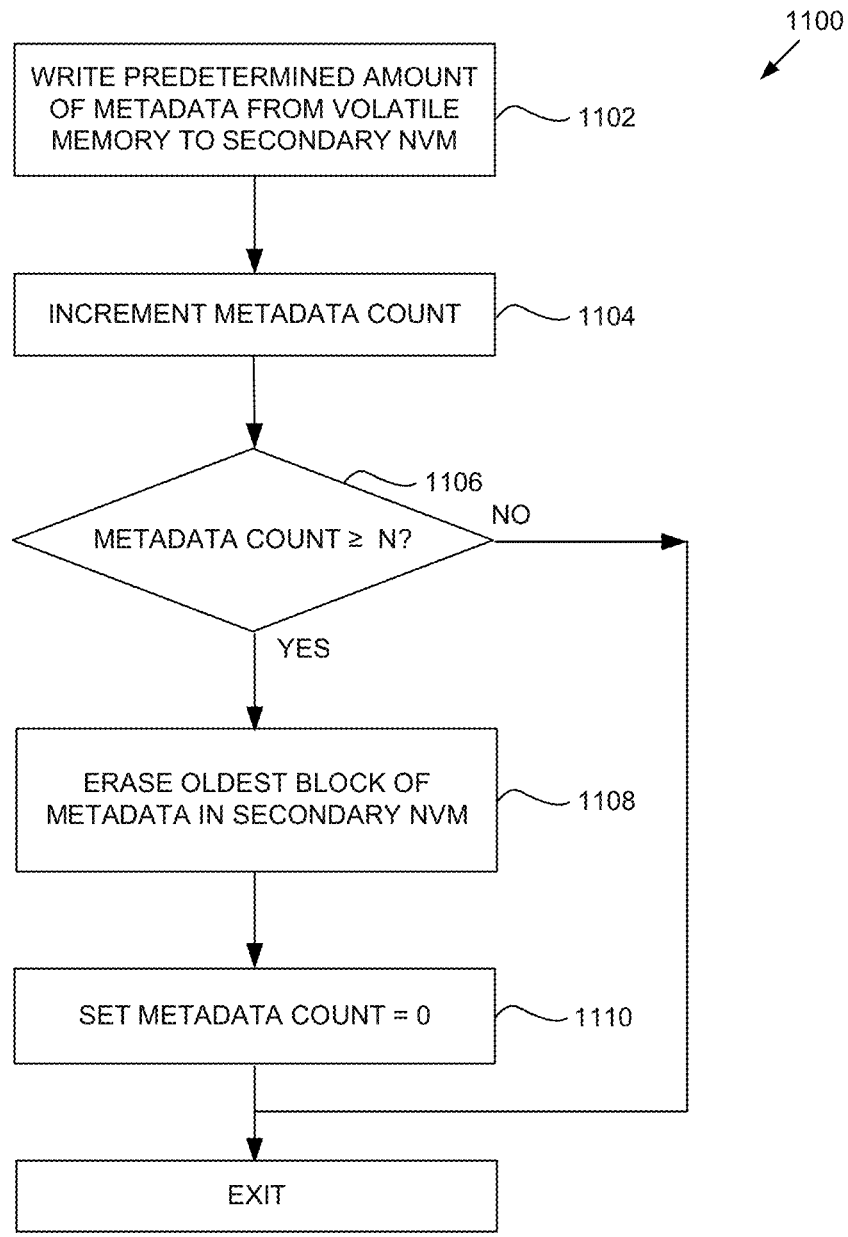
FIG. 11 is a flow diagram showing a process for determining when to erase an oldest block of metadata in a secondary NVM in accordance with one embodiment of the invention.

FIG. 11 shows a process 1100 for determining when to erase an oldest block of metadata in a secondary NVM 106 (FIG. 1A, 4A), 206, (FIG. 2A), 306*a*, 306*b* (FIG. 3A) in a data storage device 100-400 (FIG. 1A-4A), in accordance with one embodiment of the invention. The process 1100 can be implemented by the control circuitry 102 (FIG. 1A), 202 (FIG. 2A), 302 (FIG. 3A), 402 (FIG. 4A) of the data storage device 100-400 (FIG. 1A-4A) (e.g., an HDD or an SSHD).

The process 1100 begins at block 1102, where a predetermined amount of metadata is written from a volatile memory 110 (FIG. 1A-4A) to the secondary NVM. The metadata may comprise, for example, a mapping table update. In one embodiment, the predetermined amount of metadata corresponds to a predetermined number of memory units (e.g., pages) of a predetermined size (e.g., 14×256B pages of metadata) comprising mapping table updates. In block 1104, the process 1100 increments a metadata count, and in block 1106 the process determines if the metadata count is greater than or equal to N. When the metadata count is not greater than or equal to N, the process exits; and when the metadata count is greater than or equal to N, the process in block 1108 erases the oldest block of metadata in the secondary NVM, and in block 1110, sets the metadata count equal to 0 and exits. In one embodiment, when the process 1100 exits after determining that the metadata count is less than N in block 1106, the process continues to repeat blocks 1102, 1104, and 1106 until the process 1100 determines that the metadata count is greater than or equal to N, and then executes blocks 1108 and 1100 and exits.

Figure 12:
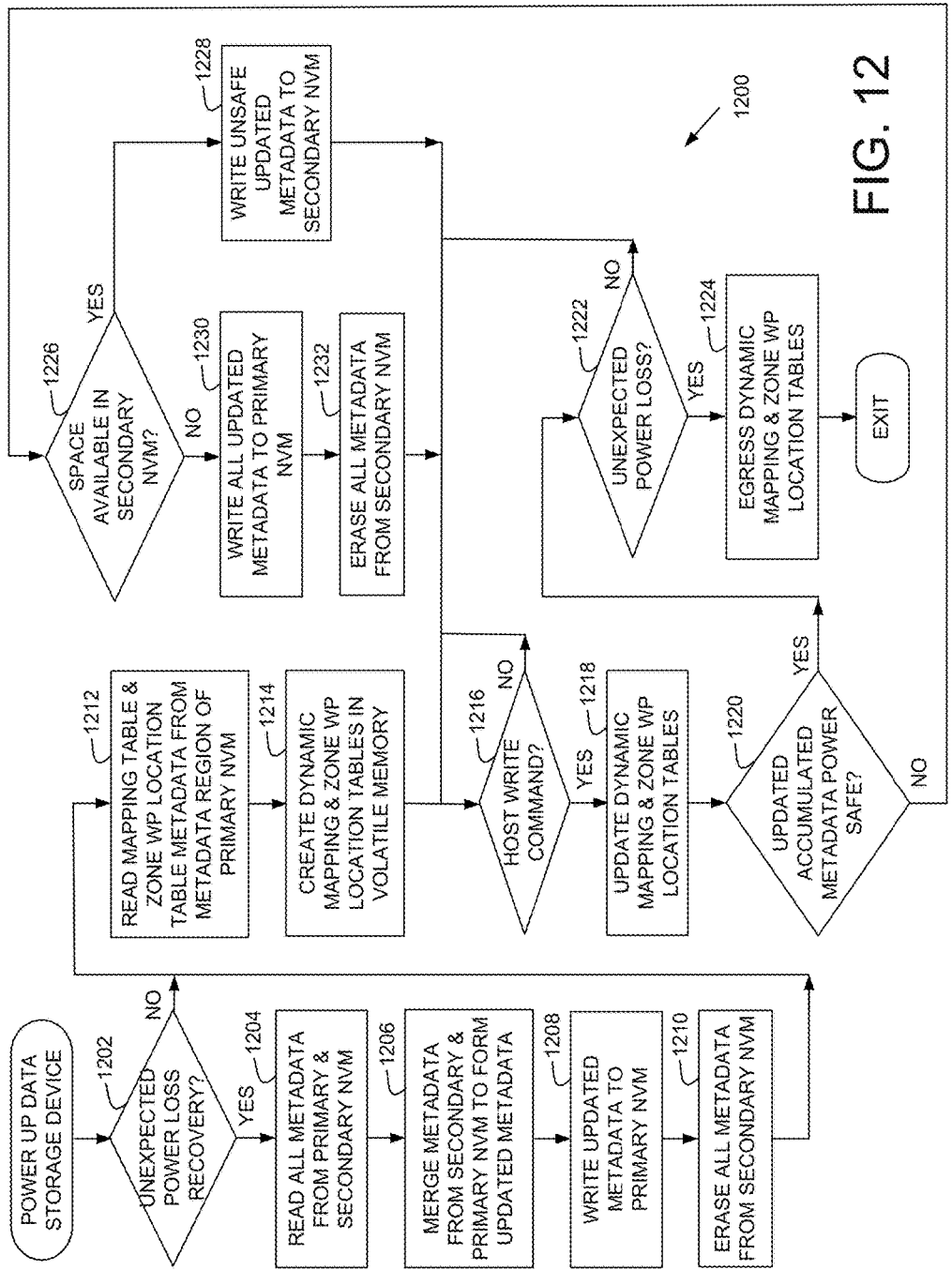
FIG. 12 is a flow diagram showing a process for determining when to write metadata (e.g., mapping and zone WP location table updates) that has accumulated in a volatile memory to a secondary NVM in a data storage device that utilizes drive-managed LBA indirection (e.g., SMR) for writing user data in a primary NVM, in accordance with one embodiment of the invention.

FIG. 12 shows a process 1200 for determining when to write metadata (e.g., mapping and zone WP location table updates) that has accumulated in a volatile memory 110 (FIG. 1A-4A) to a secondary NVM 106 (FIG. 1A, 4A), 206, (FIG. 2A), 306*a*, 306*b* (FIG. 3A) in a data storage device 100-400 (FIG. 1A-4A) that uses LBA indirection (e.g., drive-managed SMR) for writing data in a primary NVM 104-404 (FIG. 1A-4A), in accordance with one embodiment of the invention. The process 1200 can be implemented by the control circuitry 102 (FIG. 1A), 202 (FIG. 2A), 302 (FIG. 3A), 402 (FIG. 4A) of the data storage device 100-400 (FIG. 1A-4A) (e.g., an HDD or SSHD).

After the data storage device is powered up, the process 1200 begins in block 1202, where the process 1200 determines if a recovery procedure from an unexpected power loss is being implemented, and if the recovery procedure is being implemented, the process 1200 reads all the metadata from the primary and the secondary NVM. In one embodiment, the process 1200 reads all mapping and zone WP location table metadata from a metadata storage region of the primary NVM and mapping and zone WP location table update metadata from the secondary NVM. In block 1206, the process 1200 merges the metadata from the secondary and primary NVM to form updated metadata, writes the updated metadata to the primary NVM in block 1208, and erases all the metadata from the secondary NVM in block 1210.

If there is no recovery procedure being implemented after an unexpected power loss, or there is a recovery procedure being implemented and after block 1210 has been executed, the process 1200 in FIG. 12 proceeds to block 1212, where the process 1200 reads the mapping table and zone WP location table metadata from the metadata region of the primary NVM, and in block 1214 the process 1200 creates dynamic mapping and zone WP location tables in the volatile memory. In block 1216, the process 1200 determines if a write command is received from the host, and if not, the process 1200 continues to execute block 1216 until a host write command is received. When a host write command is received, the process 1200 updates in block 1218 the dynamic mapping and zone WP tables in the volatile memory with updated mapping and zone WP table metadata associated with the host write command.

In block 1220, the process determines if the updated metadata that has accumulated in the volatile memory is power safe (i.e., whether the accumulated metadata is protected by an egress process (as previously described) after an occurrence of an unexpected power loss. In embodiments of the invention shown in FIG. 1A-4A, the accumulated metadata in the volatile memory is safe from an unexpected power loss if it resides in the power-safe region 112 of the volatile memory 110. If the process 1200 determines that the accumulated metadata in the volatile memory is power safe, the process 1200 determines in block 1222 if an unexpected power loss is occurring, and if not, the process 1200 proceeds to block 1216 to determine if a host write command is being received. If the process 1200 determines that an unexpected power loss is occurring, the process 1200 writes in block 1224 the dynamic updated mapping and zone WP location tables in the volatile memory to the secondary NVM via an egress process and exits.

If the process 1200 determines in block 1220 that the updated accumulated metadata in the volatile memory is not power safe, the process 1200 determines in block 1226 if space is available in the secondary NVM, and if so the process 1200 writes in block 1228 the portion of the updated metadata in the volatile memory that is not power safe to the secondary NVM and executes block 1216 again. If the process 1200 determines that there is not sufficient space available in the secondary NVM, the process 1200 writes in block 1230 all updated metadata in the volatile memory to the primary NVM, erases in block 1232 all the metadata from the secondary NVM, and executes block 1216 again.

Figure 13:
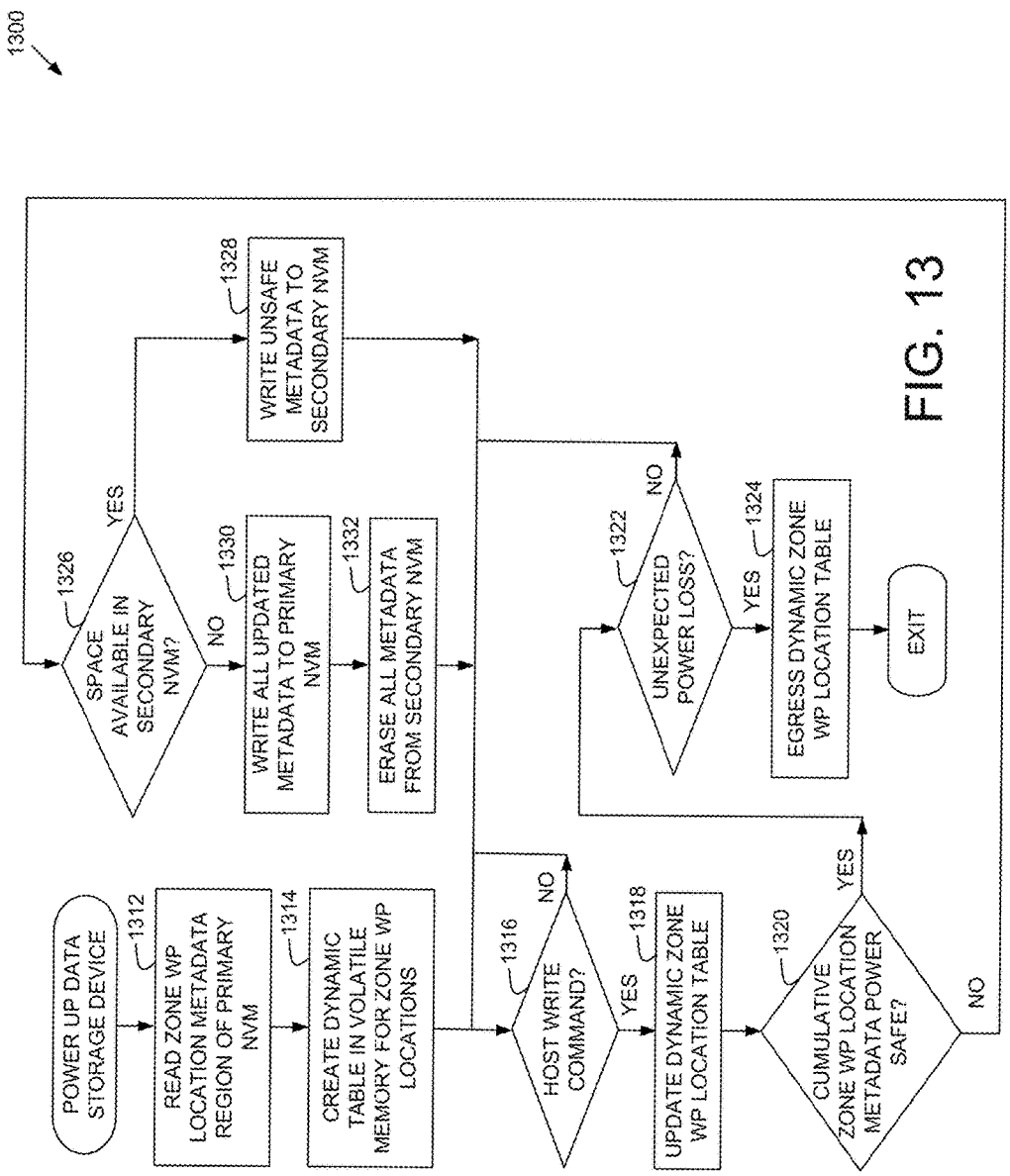
FIG. 13 is a flow diagram showing a process for determining when to write metadata (e.g., zone WP location table updates) that has accumulated in a volatile memory to a secondary NVM in a data storage device that utilizes host-managed SMR for writing user data in a primary NVM, in accordance with one embodiment of the invention.

FIG. 13 shows a process 1300 for determining when to write metadata (e.g., zone WP location table updates) that has accumulated in a volatile memory 110 (FIG. 1A-4A) to a secondary NVM 106 (FIG. 1A, 4A), 206, (FIG. 2A), 306a, 306b (FIG. 3A) in a data storage device 100-400 (FIG. 1A-4A) that utilizes host-managed, full LBA indirection (e.g., SMR) for writing data in a primary NVM 104-404 (FIG. 1A-4A), 906 (FIG. 9), in accordance with one embodiment of the invention. The process 1300 can be implemented by the control circuitry 102 (FIG. 1A), 202 (FIG. 2A), 302 (FIG. 3A), 402 (FIG. 4A) of the data storage device 100-400 (FIG. 1A-4A) (e.g., an HDD or an SSHD).

In process 1300 in FIG. 13, blocks 1312-1332 are similar to respective blocks 1212-1232 in process 1200 in FIG. 12, with a difference being that the metadata referred to in process 1300 in FIG. 13 comprises zone WP location table updates, while the metadata referred to in process 1200 in FIG. 12 comprises mapping and zone WP location table updates. Thus, to preserve brevity in the patent application, the execution of blocks 1312-1332 of process 1300 in FIG. 13 will not be discussed.

FIG. 14 shows a process 1400 for determining when to write metadata (e.g., mapping table updates) that has accumulated in a volatile memory 110 (FIG. 1A-4A) to a secondary NVM 106 (FIG. 1A, 4A), 206, (FIG. 2A), 306a, 306b (FIG. 3A) in a data storage device 100-400 (FIG. 1A-4A) that utilizes LBA indirection for writing data in an MBC in a primary NVM (e.g., MBC 513 in primary NVM 506 in FIG. 5), in accordance with one embodiment of the invention. The process 1400 may be implemented by the control circuitry 102 (FIG. 1A), 202 (FIG. 2A), 302 (FIG. 3A), 402 (FIG. 4A) of the data storage device 100-400 (FIG. 1A-4A) (e.g., an HDD or an SSHD).

The process 1400 in FIG. 14 begins at block 1402, where the process 1400 reads a mapping table from the metadata storage region 515 (FIG. 5) of a disk 506 (the primary NVM), and creates in block 1404 a dynamic mapping table in the volatile memory. In block 1406, the process 1400 determines if a write command is received from the host, and if not, the process 1400 continues to execute block 1406 until a host write command is received. When a host write command is received, the process 1400 updates in block 1408 the dynamic mapping table in the volatile memory with updated mapping table metadata associated with the host write command.

In block 1410, the process 1400 determines if mapping table updates have been completed for a target number of data tracks in the disk 507 (FIG. 5) (the primary NVM), and if so, the process 1400 determines in block 1412 if enough time has expired to write to the secondary NVM at a safe speed. If the process 1400 determines that enough time has not expired to write to the secondary NVM at a safe speed, or the process 1400 determines in block 1410 that updates for a target number of tracks has not been completed, the process determines in block 1414 if an unexpected power loss is occurring, and if not, the process 1400 proceeds to block 1406 in which to determine if a host write command is being received. If the process 1400 determines that an unexpected power loss is occurring, the process 1400 writes in block 1416 the dynamic updated mapping table in the volatile memory to the secondary NVM via an egress process (as previously described) and exits.

If the process 1400 determines in block 1412 that enough time has expired to write to the secondary NVM at a safe speed, the process 1400 determines in block 1418 if space is available in the secondary NVM, and if so the process 1400 writes in block 1420 the updated mapping table metadata in the volatile memory to the secondary NVM and executes block 1406 again. If the process 1400 determines that there is not sufficient space available in the secondary NVM, the process 1400 writes in block 1422 all updated metadata in the volatile memory to the primary NVM, erases, in block 1424, all the metadata in the secondary NVM, and executes block 1406 again.

It is noted that the blocks (i.e., steps) in the flow diagrams in FIGS. 1B, 2B, 3B, 4B, 10, 11, 12, 13, and 14 are shown in a particular order to illustrate respective embodiments of the invention. In other embodiments, the blocks in the flow diagrams in FIGS. 1B, 2B, 3B, 4B, 10, 11, 12, 13, and 14 may be performed in a different order.

Any suitable control circuitry 102 (FIG. 1A), 202 (FIG. 2A), 302 (FIG. 3A), 402 (FIG. 4A) may be employed in the embodiments of the invention, such as any suitable integrated circuit or circuits. For example, the control circuitry may be implemented within a read channel integrated circuit, or in a component separate from the read channel, such as a disk controller, or certain blocks described above may be performed by a read channel and others by a disk controller. In one embodiment, the read channel and disk controller are implemented as separate integrated circuits, and in an alternative embodiment they are fabricated into a single integrated circuit or SOC. In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the blocks in the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 424 (FIG. 4A) and read into a volatile memory 110 (FIG. 1A-4A) when the disk drive is powered on. In yet another embodiment, the control circuitry comprises suitable logic circuitry, such as state machine circuitry.

What is claimed is:

1. A data storage device comprising:
a volatile memory;
a primary non-volatile memory (NVM);
a first secondary NVM;
control circuitry coupled to the volatile memory and the first secondary and the primary NVM;
wherein the control circuitry is configured to:
 (a) write metadata and user data associated with a host write command to the volatile memory;
 (b) write the user data to the primary NVM;
 (c) continue to write metadata associated with each of one or more host write commands to the volatile memory, and when a first condition is met, write metadata that has accumulated in the volatile memory to the first secondary NVM; and (d) repeat (c), and when a second condition is met, then write at least a portion of the metadata that has accumulated in the first secondary NVM or the volatile memory to the primary NVM, wherein the primary NVM is a disk comprising a plurality of data tracks, wherein the control circuitry is further configured to write user data associated with each host write command to at least one of the data tracks, and wherein the first condition is met when the control circuitry has written user data to a first number of data tracks.

2. The data storage device as recited in claim 1, wherein the metadata associated with each host write command comprises a mapping table update, and wherein the first condition is met when the volatile memory receives a first number of mapping table updates.

3. The data storage device as recited in claim 2, wherein the primary NVM comprises a disk comprising a media-based cache, and wherein the mapping table update comprises an update for a media-based cache mapping table.

4. The data storage device as recited in claim 1, wherein the first condition is met after a predetermined amount of time has expired after a first write of metadata to the first secondary NVM.

5. The data storage device as recited in claim 1, wherein the primary NVM comprises a plurality of zones, and wherein the metadata associated with each host write command comprises a zone write pointer update, and wherein the first condition is met when a number of open zones reaches a threshold.

6. The data storage device as recited in claim 5, wherein the primary NVM comprises a metadata region, and wherein, prior to receiving the host write command, the control circuitry is further configured to create one or more tables in the volatile memory for zone write pointers.

7. The data storage device as recited in claim 1, wherein the first condition is based on a rate of metadata generated relative to a throughput of the first secondary NVM.

8. The data storage device as recited in claim 1, wherein the first condition is met when the control circuitry detects an unexpected power loss to the data storage device.

9. The data storage device as recited in claim 1, wherein the second condition is met when one or more of the following occurs:
a first amount of metadata has accumulated in the first secondary NVM,
the first secondary NVM is substantially full, or
when the host enters an idle state or when the data storage device enters a state in which no metadata is created.

10. The data storage device as recited in claim 1, wherein the control circuitry is further configured to erase metadata in the first secondary NVM after metadata has been written to the first secondary NVM according to a predetermined block ratio of metadata erased to metadata written.

11. The data storage device as recited in claim 1, wherein the primary NVM comprises a metadata region, and wherein, when the data storage device is powered up, the control circuitry is further configured to:
read metadata in the metadata region of the primary NVM and metadata in the first secondary NVM;
merge the metadata from the metadata region of the primary NVM and the metadata in the first secondary NVM to form updated metadata; and
write the updated metadata to the metadata region of the primary NVM.

12. The data storage device as recited in claim 11, wherein the updated metadata in the first secondary NVM is erased after the updated metadata has been written to the metadata region of the primary NVM.

13. The data storage device as recited in claim 1, further comprising a second secondary NVM, wherein the control circuitry is further configured to alternately write metadata that has accumulated in the volatile memory to the first and second secondary NVMs each time the first condition is met, and wherein each of the first and the second secondary NVM comprises an independently operable memory device or a memory bank.

14. The data storage device as recited in claim 13, wherein the control circuitry is further configured to erase metadata in the first secondary NVM when writing metadata to the second secondary NVM, and vice versa.

15. The data storage device as recited in claim 1, further comprising a second secondary NVM, wherein, each time the first condition is met, the control circuitry is further configured to write metadata that has accumulated in the volatile memory to the first secondary NVM until it is substantially full, and then write metadata that has accumulated in the volatile memory to the second secondary NVM, and wherein each of the first and the second secondary NVM comprises a discrete memory device or a memory bank.

16. The data storage device as recited in claim 1, wherein the first condition is met when the amount of metadata in the volatile memory reaches a power safe limit of the volatile memory.

17. A method to manage metadata associated with user data in a data storage device comprising volatile memory, a first secondary non-volatile memory (NVM), and a primary NVM, the method comprising:
(a) writing metadata and user data associated with a host write command to the volatile memory;
(b) writing the user data to the primary NVM, wherein the primary NVM is a disk comprising a plurality of data tracks;
(c) continue writing metadata associated with each of one or more host write commands to the volatile memory, and when a first condition is met, writing metadata that has accumulated in the volatile memory to the first secondary NVM; and
(d) repeating (c), and when a second condition is met, then writing at least a portion of metadata that has accumulated in the first secondary NVM or the volatile memory to the primary NVM;
wherein writing user data to primary NVM comprises writing user data associated with each host write command to at least one of the data tracks, and wherein the first condition is met when user data has been written to a first number of data tracks.

18. The method as recited in claim 17, wherein the primary NVM comprises a plurality of zones, and wherein the metadata associated with each host write command comprises a zone write pointer update, and wherein the first condition is met when a number of open zones reaches a threshold.

19. The method as recited in claim 18, wherein the primary NVM comprises a metadata region, and wherein, prior to receiving the host write command, further comprising creating one or more tables in the volatile memory for zone write pointers.

20. The method as recited in claim 17, wherein the first condition is based on a rate of metadata generated relative to a throughput of the first secondary NVM.

21. The method as recited in claim 17, wherein the first condition is met when an unexpected power loss to the data storage device is detected.

22. The method as recited in claim 17, wherein the second condition is met when one or more of the following occurs:
   a first amount of metadata has accumulated in the first secondary NVM,
   the first secondary NVM is substantially full, or
   when the host enters an idle state or when the data storage device enters a state in which no metadata is created.

23. The method as recited in claim 17, further comprising erasing metadata in the first secondary NVM after metadata has been written to the first secondary NVM according to a predetermined block ratio of metadata erased to metadata written.

24. The method as recited in claim 17, wherein the primary NVM comprises a metadata region, and wherein, when the data storage device is powered up, further comprising:
   reading metadata in the metadata region of the primary NVM and metadata in the first secondary NVM;
   merging the metadata from the metadata region of the primary NVM and the metadata in the first secondary NVM to form updated metadata; and
   writing the updated metadata to the metadata region of the primary NVM.

25. The method as recited in claim 24, wherein the updated metadata in the first secondary NVM is erased after the updated metadata has been written to the metadata region of the primary NVM.

26. The method as recited in claim 17, wherein the first condition is met when the amount of metadata in the volatile memory reaches a power safe limit of the volatile memory.

* * * * *